United States Patent
Suh

(10) Patent No.: US 9,706,512 B2
(45) Date of Patent: Jul. 11, 2017

(54) SECURITY METHOD AND SYSTEM FOR SUPPORTING RE-SUBSCRIPTION OR ADDITIONAL SUBSCRIPTION RESTRICTION POLICY IN MOBILE COMMUNICATIONS

(71) Applicant: Samsung Electronics Co., Ltd, Gyeonggi-do (KR)

(72) Inventor: Kyungjoo Suh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/784,899

(22) PCT Filed: Apr. 15, 2014

(86) PCT No.: PCT/KR2014/003251
§ 371 (c)(1),
(2) Date: Oct. 15, 2015

(87) PCT Pub. No.: WO2014/171707
PCT Pub. Date: Oct. 23, 2014

(65) Prior Publication Data
US 2016/0057725 A1 Feb. 25, 2016

(30) Foreign Application Priority Data
Apr. 15, 2013 (KR) .................. 10-2013-0041286

(51) Int. Cl.
*H04W 60/04* (2009.01)
*H04W 60/06* (2009.01)
(Continued)

(52) U.S. Cl.
CPC ............ *H04W 60/04* (2013.01); *G06K 17/00* (2013.01); *G06Q 50/30* (2013.01); *H04W 8/183* (2013.01);
(Continued)

(58) Field of Classification Search
None
See application file for complete search history.

(56) References Cited

U.S. PATENT DOCUMENTS

2008/0051069 A1* 2/2008 Chin .................. H04M 15/00
455/414.1
2008/0086371 A1* 4/2008 Daymond .......... G06Q 30/0255
705/14.53
(Continued)

FOREIGN PATENT DOCUMENTS

WO WO 2011/087312 A2 7/2011
WO WO 2012/124904 A2 9/2012
(Continued)

OTHER PUBLICATIONS

International Search Report dated Jul. 15, 2014 in connection with International Patent Application No. PCT/KR2014/003251, 5 pages.
(Continued)

*Primary Examiner* — Charles Appiah
*Assistant Examiner* — Margaret G Mastrodonato

(57) ABSTRACT

Provided is a system that enables a device to perform a communication function. A communication method for a user equipment (UE) may include: sending a subscription request for a first network; receiving information regarding an identifier of a first profile associated with the first network and the date on which the first profile is deactivated; and determining whether a subscription to the first network is allowed on the basis of the date information. Accordingly, in an environment such as Universal Terrestrial Radio Access Network (UTRAN), GSM/EDGE Radio Access Network (GERAN) or Evolved UTRAN (EUTRAN), when a device having an eSIM attempts to make a re-subscription to an MNO, or when the device attempts to make a re-subscription or additional subscription to an MNO according to a national electricity or infrastructure plan for M2M equipment, it is
(Continued)

possible to accommodate MNO policies and determine whether a re-subscription to an MNO is allowed according to the MNO policies. When MNO re-subscription is not allowed, a lock may be placed so as to update or reconfigure communication and security information in an easy and safe manner.

14 Claims, 14 Drawing Sheets

(51) Int. Cl.
    *H04W 8/18*       (2009.01)
    *H04W 4/24*       (2009.01)
    *H04W 48/16*     (2009.01)
    *H04W 76/02*     (2009.01)
    *G06Q 50/30*     (2012.01)
    *G06K 17/00*     (2006.01)

(52) U.S. Cl.
    CPC .............. *H04W 60/06* (2013.01); *H04W 4/24* (2013.01); *H04W 48/16* (2013.01); *H04W 76/02* (2013.01)

(56) References Cited

U.S. PATENT DOCUMENTS

| | | | |
|---|---|---|---|
| 2011/0130118 A1* | 6/2011 | Fan .................. | H04M 15/00 455/411 |
| 2012/0258704 A1 | 10/2012 | Kim et al. | |
| 2012/0309344 A1 | 12/2012 | Ferrazzini et al. | |
| 2014/0010161 A1 | 1/2014 | Jeong et al. | |
| 2014/0141763 A1 | 5/2014 | Suh et al. | |

FOREIGN PATENT DOCUMENTS

| WO | WO 2013/009059 A2 | 1/2013 |
|---|---|---|
| WO | WO 2013/032219 A1 | 3/2013 |

OTHER PUBLICATIONS

Written Opinion of the International Searching Authority dated Jul. 15, 2014 in connection with International Patent Application No. PCT/KR2014/003251, 6 pages.

* cited by examiner

SECURITY METHOD AND SYSTEM FOR SUPPORTING RE-SUBSCRIPTION OR ADDITIONAL SUBSCRIPTION RESTRICTION POLICY IN MOBILE COMMUNICATIONS

CROSS-REFERENCE TO RELATED APPLICATION(S)

The present application claims priority under 35 U.S.C. §365 to International Patent Application No. PCT/KR2014/003251 filed Apr. 15, 2014, entitled "SECURITY METHOD AND SYSTEM FOR SUPPORTING RE-SUBSCRIPTION OR ADDITIONAL SUBSCRIPTION RESTRICTION POLICY IN MOBILE COMMUNICATIONS", and, through International Patent Application No. PCT/KR2014/003251, to Korean Patent Application No. 10-2013-0041286 filed Apr. 15, 2013, each of which are incorporated herein by reference into the present disclosure as if fully set forth herein.

TECHNICAL FIELD

The present invention relates to a system enabling a device to perform a communication function. More particularly, the present invention relates to a security related system and method that support a procedure for handling re-subscription or additional subscription policies by utilizing a subscriber identity module (SIM), in particular an embedded SIM (eSIM), permitting a device to perform communication. The present invention also relates to a method and system that resolve and manage policy issues, which may arise when information regarding data, security and subscriber identification is changed or configured through an eSIM in relation to re-subscription or additional subscription to a mobile network operator, on the basis of operations between protocols and other network entities.

BACKGROUND ART

In a system enabling devices to perform a communication function, the devices may include various apparatuses or appliances such as existing mobile communication terminals, machine type communication devices, consumer devices, and vending machines. A subscriber identity module (SIM) may be used to enable a device to perform communication. Particularly, unlike a conventional SIM, in the case of an embedded SIM (eSIM) permitting a change in the mobile network operator (MNO) or configuration of initial SIM information, it is necessary to set and change policies so that MNO information and security settings can be configured. It is also necessary to provide a scheme that enables the device to perform communication and makes a procedure for re-subscription or additional subscription to an MNO safe and easy by placing a restriction or lock when re-subscription or additional subscription to an MNO is attempted.

However, owing to security vulnerability of MNO and terminal related information and other operational difficulties in the exiting communication system infrastructure driven by the MNO, there are insufficient discussions on systems and schemes for handling MNO information, security settings, policy settings, and restrictions on MNO re-subscription or additional subscription. This may cause security exposure or communication inefficiency.

DISCLOSURE OF INVENTION

Technical Problem

The present invention relates to a SIM (eSIM in particular) that is used to enable a device to perform communication with an evolved mobile communication system such as 3rd Generation Partnership Project (3GPP) Evolved Packet System (EPS). That is, the present invention aims to apply a specific policy in the eSIM. Accordingly, an aspect of the present invention is to provide a scheme whereby a device having an eSIM may communicate through a first MNO network, perform MNO switching to another MNO, and make a re-subscription to the first MNO network for communication. Here, the device may determine whether to enforce locking according to MNO policies. Another aspect of the present invention is to provide a scheme whereby a device having an eSIM may communicate through an MNO network, and may determine whether to enforce locking for additional communication through the MNO network according to MNO policies and install an additional MNO profile depending upon the determination.

Another aspect of the present invention is to provide various embodiments for accommodation and application of policies related to MNO switching, enabling the eSIM to perform subscriber identification as in the case of an existing SIM. Another aspect of the present invention is to provide a scheme that enables reuse of a device or eSIM in concert with MNO switching during the product lifecycle without being locked to a particular MNO but that can place a lock to block switching to a different MNO or to block additional subscription to the same MNO according to MNO policies.

Hereinabove, the aspects of the present invention are described in a relatively broad perspective to help those skilled in the art understand the present invention. Other aspects constituting the subject matter of the present invention will be more apparent from the following detailed description.

Solution to Problem

In accordance with an aspect of the present invention, there is provided a method of communication for a user equipment (UE). The method may include: sending a subscription request for a first network; receiving information regarding an identifier of a first profile associated with the first network and the date on which the first profile is deactivated; and determining whether a subscription to the first network is allowed on the basis of the date information.

Determining whether a subscription to the first network is allowed may include: determining whether a preset duration has expired from the deactivation date of the first profile; and connecting to, when the preset duration has expired from the deactivation date of the first profile, the first network by use of information corresponding to the first profile.

Determining whether a subscription to the first network is allowed may include: sending information that is necessary for determining whether a preset duration has expired from the deactivation date of the first profile; and receiving an indication to whether access to the first network is allowed.

The method may further include providing an interface that notifies a user of presence of old subscription information at the first network by use of the first profile.

In accordance with another aspect of the present invention, there is provided a method of communication for a device. The method may include: receiving a subscription request, for a first network, containing information regarding an identifier of a first profile associated with the first network and the date on which the first profile is deactivated; and determining whether a subscription to the first network is allowed on the basis of the date information.

Determining whether a subscription to the first network is allowed may include: determining whether a preset duration has expired from the deactivation date of the first profile; and sending, when the preset duration has expired from the deactivation date of the first profile, an indication indicating that a subscription to the first network is allowed.

The method may further include: sending a request for information that is necessary for determining whether a preset duration has expired from the deactivation date of the first profile; and receiving the information that is necessary for determining whether the preset duration has expired from the deactivation date of the first profile.

In accordance with another aspect of the present invention, there is provided a user equipment. The user equipment may include: a communication unit to communicate with an external device; and a subscriber identity module (SIM) to perform a process of sending a subscription request for a first network, receiving information regarding an identifier of a first profile associated with the first network and the date on which the first profile is deactivated, and determining whether a subscription to the first network is allowed on the basis of the date information.

In accordance with another aspect of the present invention, there is provided a device in a communication system. The device may include: a communication unit to communicate with a user equipment; and a control unit to perform a process of receiving a subscription request, for a first network, containing information regarding an identifier of a first profile associated with the first network and the date on which the first profile is deactivated, and determining whether a subscription to the first network is allowed on the basis of the date information.

In accordance with another aspect of the present invention, there is provided a method of communication for a user equipment. The method may include: sending, while having a first subscription to a first network through a first profile, a subscription request for a second subscription to the first network; receiving first network access information containing a second profile identifier associated with the first network as a response to the subscription request; and determining whether unsubscription restriction information related to the second subscription is contained in the first network access information.

Determining whether unsubscription restriction information related to the second subscription is contained may include: determining whether cancellation of the second subscription is not allowed for a preset duration; and blocking, when cancellation of the second subscription is not allowed for the preset duration, cancellation of the second subscription for the preset duration.

Determining whether unsubscription restriction information related to the second subscription is contained may include: sending information that is necessary for determining whether cancellation of the second subscription is not allowed for a preset duration; and receiving an indication indicating that cancellation of the second subscription for the first network is not allowed within the preset duration.

Determining whether unsubscription restriction information related to the second subscription is contained may further include providing an interface that notifies a user of presence of unsubscription restriction information related to the second subscription for the first network.

In accordance with another aspect of the present invention, there is provided a method of communication for a device. The method may include: receiving, while a first subscription to a first network is maintained, a subscription request for a second subscription to the first network; sending first network access information containing a second profile identifier associated with the first network as a response to the subscription request; and determining whether the first network access information contains unsubscription restriction information related to the second subscription.

Determining whether the first network access information contains unsubscription restriction information may include: determining whether cancellation of the second subscription is not allowed for a preset duration; and sending, when cancellation of the second subscription is not allowed for the preset duration, an indication indicating that cancellation of the second subscription is not allowed for the preset duration.

The method may further include: sending a request for information that is necessary for determining whether cancellation of the second subscription is not allowed for a preset duration; and receiving the information that is necessary for determining whether cancellation of the second subscription is not allowed for the preset duration.

In accordance with another aspect of the present invention, there is provided a user equipment. The user equipment may include: a communication unit to communicate with an external device; and a subscriber identity module (SIM) to perform a process of sending, while having a first subscription to a first network through a first profile, a subscription request for a second subscription to the first network, receiving first network access information containing a second profile identifier associated with the first network as a response to the subscription request, and determining whether unsubscription restriction information related to the second subscription is contained in the first network access information.

In accordance with another aspect of the present invention, there is provided a device in a communication system. The device may include: a communication unit to communicate with a user equipment; and a control unit to perform a process of receiving, while a first subscription to a first network is maintained, a subscription request for a second subscription to the first network, sending first network access information containing a second profile identifier associated with the first network as a response to the subscription request, and determining whether the first network access information contains unsubscription restriction information related to the second subscription.

Advantageous Effects of Invention

In an environment such as Universal Terrestrial Radio Access Network (UTRAN), GSM/EDGE Radio Access Network (GERAN) or Evolved UTRAN (EUTRAN), when a device having an eSIM attempts to make a re-subscription to an MNO or when the device attempts to make a re-subscription or additional subscription to an MNO according to a national electricity or infrastructure plan for M2M equipment, it is possible to accommodate MNO policies, determine the possibility of MNO re-subscription according to MNO policies and place a lock if MNO re-subscription is not allowed, perform MNO change or other changes in a safe and easy manner, and perform communication.

When an attempt for an additional subscription is made during communication after having subscribed to an MNO, it is possible to place a removal blocking lock on the new subscription by applying MNO policies, achieving stable and uninterrupted communication.

When a re-subscription or additional subscription is not allowed owing to MNO policies, it is possible to safely update or reconfigure communication and security information in the eSIM by placing a lock. Hence, efficiency and security of communication can be heightened.

Other advantages and salient features of the present invention will become apparent to those skilled in the art from the following detailed description, which, taken in conjunction with the annexed drawings, discloses various embodiments of the present invention.

MODE FOR THE INVENTION

Hereinafter, exemplary embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should not be limited to the literal or commonly employed sense, but should be construed in accordance with the spirit of the invention.

The present invention described below relates to a mobile communication system environment, which enables various devices to operate as UEs capable of performing communication. The main points thereof are to provide a scheme that can accommodate MNO or common policies and apply the same to the eSIM but that can impose limitations on re-subscription or additional subscription according to the policies upon occurrence of a change event such as re-subscription or additional subscription to an MNO. Hence, a UE having an eSIM may comply with policies and perform a procedure according to the related policies while imposing limitations on change or additional subscription if necessary, enabling safe communication.

The following description of the present invention is focused on the EPS, UTRAN and GERAN of 3GPP, and may be applicable to other mobile communication systems. Those skilled in the art will recognize that various changes and modifications of the embodiments described herein (to change or update UE or SIM information, accommodating and configuring MNO and common policies, placing a change blocking lock according to the related policy in the case of re-subscription to an MNO or additional subscription to an MNO or information item modification) can be made without departing from the scope and spirit of the present invention.

Figure 1:
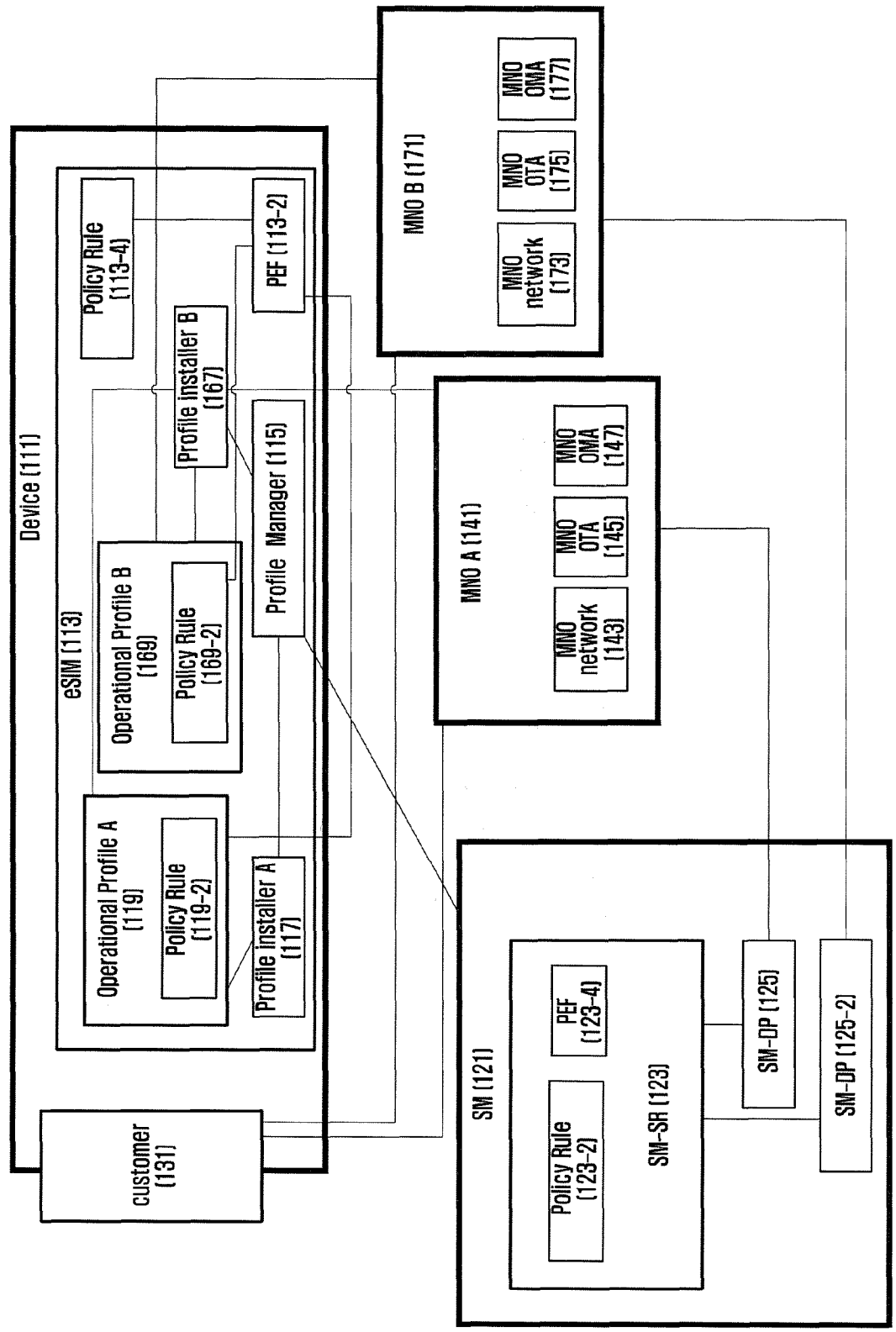
FIG. 1 is a block diagram of a mobile communication system according to an embodiment of the present invention.

As shown in FIG. 1, embodiments of the present invention relate to a 3PP environment such as EUTRAN in which various devices including communication terminals communicate with MNOs. As an embodiment, a scheme is provided that, when a device having an eSIM communicates with a first MNO, performs MNO switching to another MNO for communication, and attempts to re-subscribe to the first MNO for communication, can accommodate MNO or common policies and facilitate or hinder MNO re-subscription according to the policies. As another embodiment, a scheme is provided that, when a device having an eSIM attempts to make an additional subscription to the existing MNO, can apply policies to facilitate or hinder additional subscription. It should be understood by those skilled in the art that the above schemes are applicable to other mobile communication systems having similar technical backgrounds and channel configurations or similar architectural structures and protocols without significant modifications departing from the scope of the present invention.

FIG. 1 is a block diagram of a mobile communication system according to an embodiment of the present invention.

Referring to FIG. 1, for safe communication, the mobile communication system of the present invention may use a SIM, in particular an eSIM, to apply MNO policies to a device, and to impose or lift restrictions on re-subscription or additional subscription to an MNO according to policies. Here, the architecture of the 3GPP EPS is illustrated. The description of the present invention is focused on the EUTRAN, and may be applicable to other similar mobile communication systems.

In FIG. 1, a device 111 may be one of various devices such as a conventional user equipment (UE), machine type communication device, consumer device and vending machine. The device 111 may perform a communication function through an embedded SIM (eSIM) 113. The eSIM 113 may include a profile manager 115, profile installers 117 and 167, profiles 119 and 169, policy rules 119-2, 169-2 and 113-4, and a Policy Enforcement Function (PEF) 113-2.

The profile manager 115 may perform routing and management functions for the profiles 119 and 169 of the eSIM. The profile installers 117 and 167 may install the profiles 119 and 169 in the eSIM. The profiles 119 and 169 may include identities and security keys needed to communicate with MNOs. Here, the identities may include at least one of IMSI and MSISDN. For communication with MNOs, the security keys may include the security key K corresponding to the master key stored in the authentication center (AUC) and the SIM.

To configure a profile in the eSIM, the customer 131 has to make a subscription request to an MNO. A subscription request may be made through a subscription portal site or through the device 111. The policy rules 119-2, 169-2 and 113-4 may be present in the profiles 119 and 169 or in the eSIM. A policy rule may be differently applied according to the location thereof. This is described in more detail with reference to FIG. 2. The PEF 113-2 may enforce a policy rule present in the eSIM or in the profiles 119 and 169.

The subscription manager (SM) 121 manages a procedure whereby the device 111 sends data to the eSIM to subscribe to an MNO. The SM 121 may be composed of an SM-secure routing (SM-SR) 123, SM-data preparation (SM-DP) 125 or 125-2, and a PEF 123-4.

The SM-SR 123 and the SM-DP 125 or 125-2 may operate as a single entity (i.e. SM 121) or as separate entities according to operational scenarios. The SM-SR 123 may be shared by multiple MNOs and the SM-SR 123 may be in charge of multiple MNOs. The SM-DP 125 or 125-2 may operate separately for individual MNOs by encrypting MNO related data. In the SM 121 of FIG. 1, the policy rule 123-2 and PEF 123-4 are depicted as being present in the SM-SR 123. However, other combinations are possible.

The device 111, which may act as a UE, may access a mobile network operator (MNO) 141 or 171 by using data and security keys set for access through subscription management of the SM 121. The MNO 141 or 171 may include an MNO network 143 or 173 to manage subscription, unsubscription and location of the device 111 (UE), an MNO OTA 145 or 175 to manage MNO information through an over-the-air (OTA) interface, an MNO OMA 147 or 177 to perform the function of Open Mobile Alliance (OMA) Device Management (DM), and other related entities, functions and procedures.

Hereinabove, a description is given of the architecture of a mobile communication system according to an embodiment of the present invention.

Next, a description is given of a scheme for accommodating policies and placing a lock to block MNO re-subscription in a manner that various entities including the device 111, SM 121 and MNO 141 or 171 can communicate through the MNO network, and of a scheme for applying and enforcing policies so that related data or security information is safely configured and used in the case of an additional subscription to the same MNO.

Figure 2:
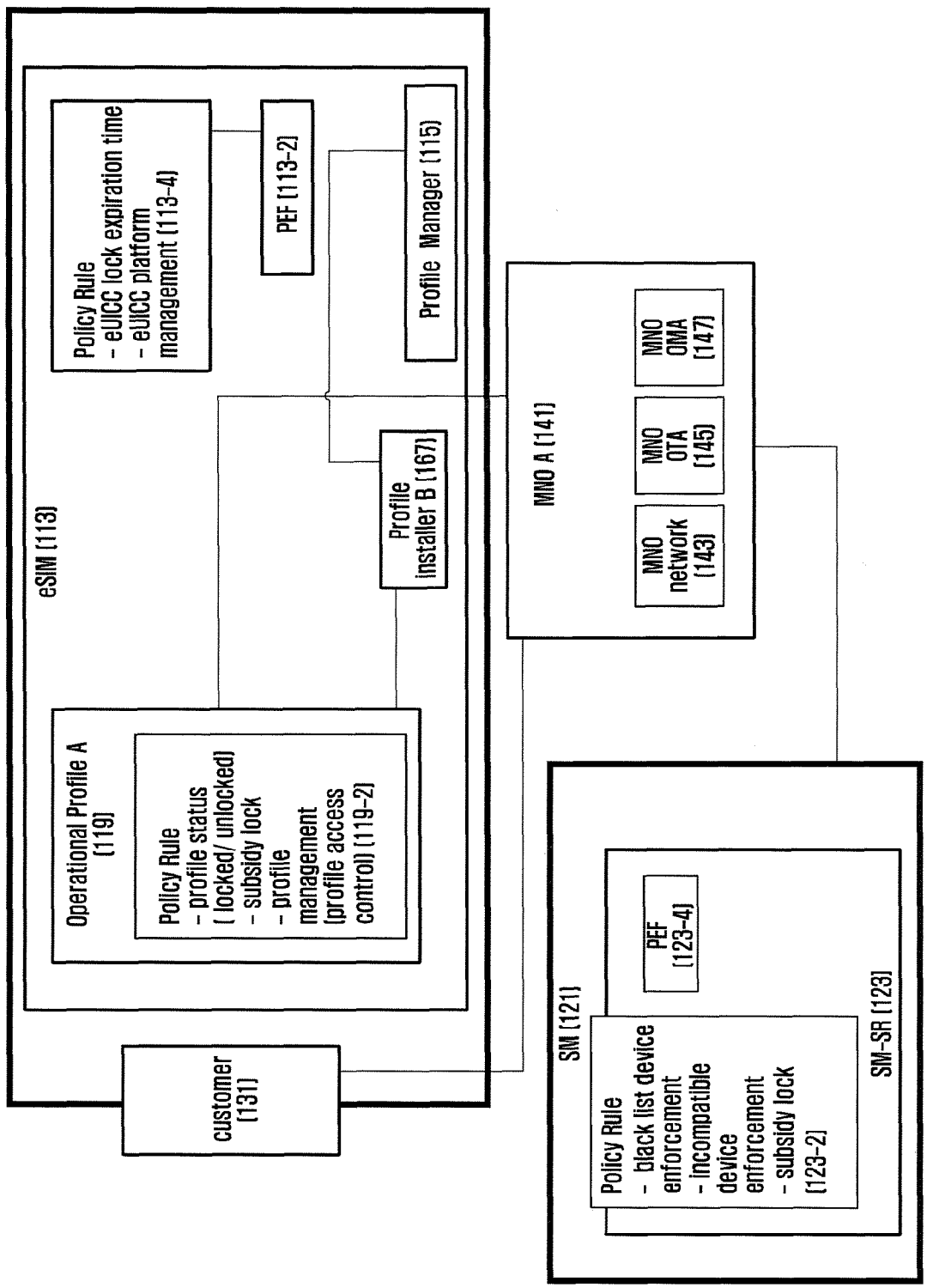
FIG. 2 is a block diagram illustrating policy rules in the mobile communication system according to an embodiment of the present invention.

FIG. 2 is a block diagram illustrating policy rules in the mobile communication system according to an embodiment of the present invention.

Referring to FIG. 2, a policy rule 119-2 present in an operational profile 119 may apply to a policy associated with the profile status or profile management. For example, for the profile status, a policy may be associated with placing and lifting a lock on the profile. For profile management, a policy may be associated with controlling access to the profile (access control).

A policy rule 113-4 present in the eSIM 113 may apply to a policy associated with managing the expiration time of an eUICC lock and placing a lock on the eUICC, or to a policy associated with eUICC platform management. The role of the PEF 113-2 in the eSIM is to enforce a policy rule present in the eUICC or eSIM or in the profile.

A policy rule 123-2 may be present in the SM 121. The SM policy rule 123-2 may apply to a rule associated with devices on the black list of a MNO network (e.g. stolen or lost mobile terminals not allowed to communicate on the MNO network). The SM policy rule 123-2 may also apply to a rule associated with unsuitable devices incompatible with the MNO environment. The role of the SM PEF 123-4 is to enforce a policy rule present in the SM 121.

Figure 3:
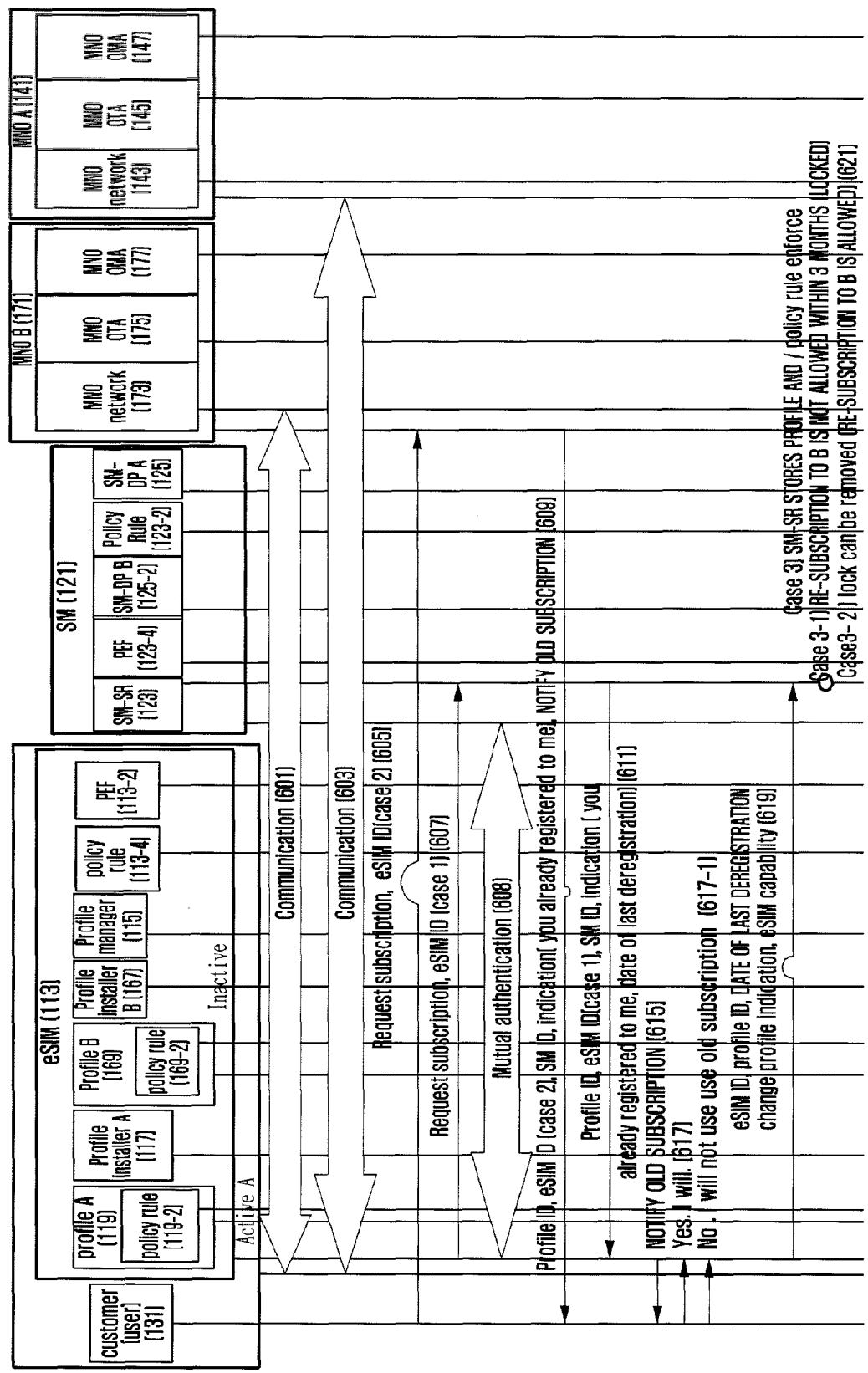
FIGS. 3 to 5 are message sequence charts depicting communication and security procedures to apply policies during MNO re-subscription according to an embodiment of the present invention.
Figure 4:
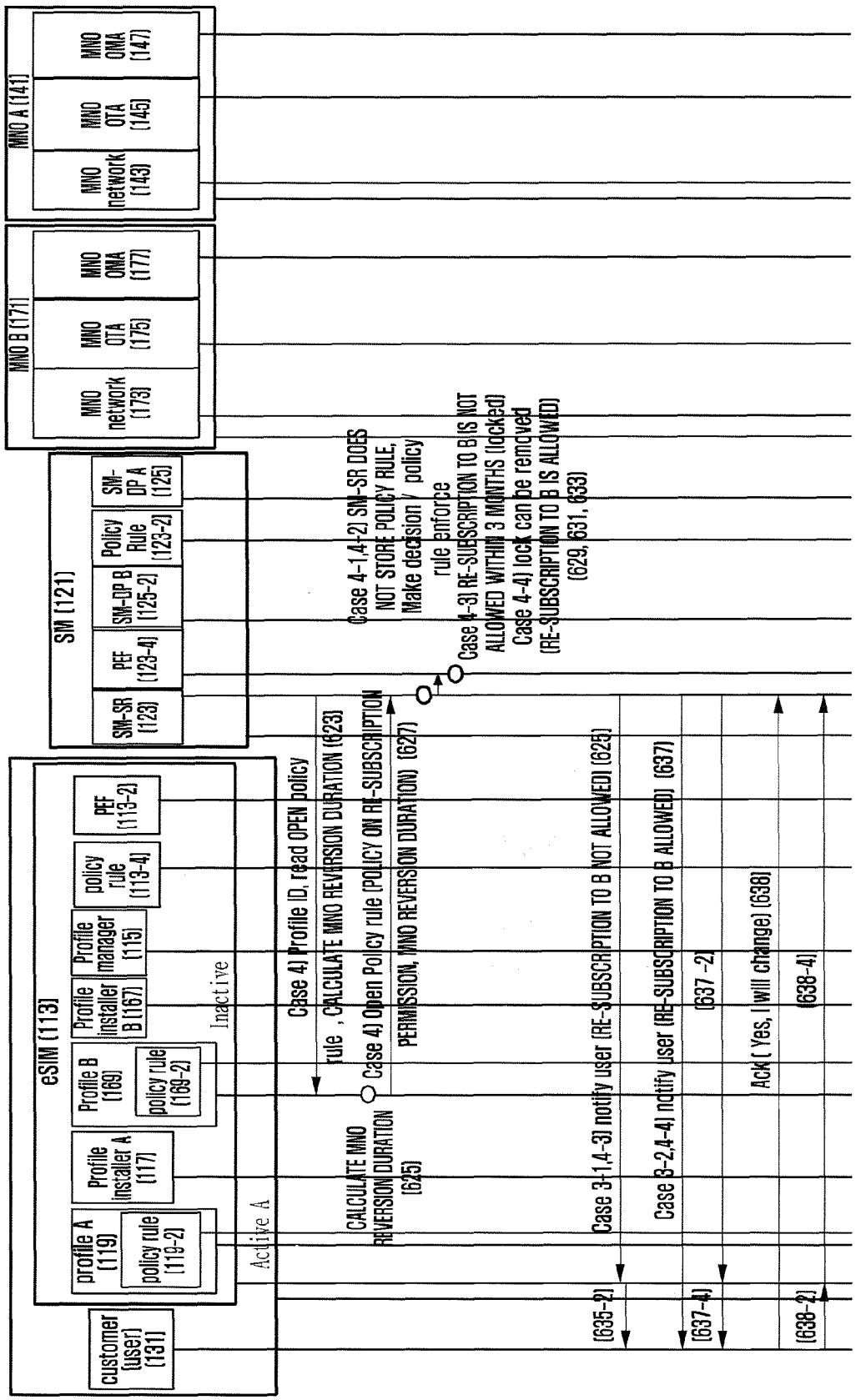
Figure 5:
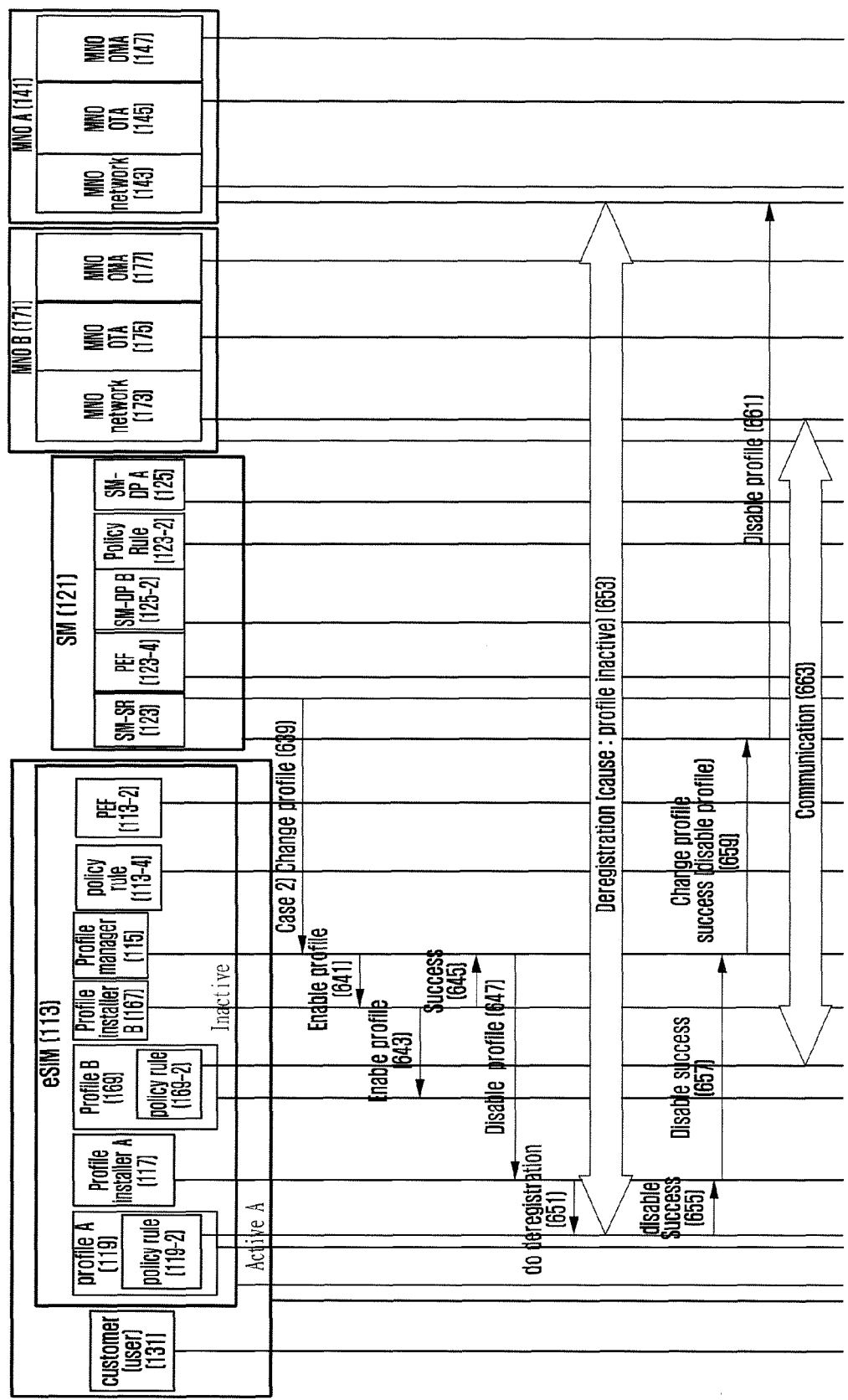

FIGS. 3 to 5 are message sequence charts depicting communication and security procedures to apply policies during MNO re-subscription according to an embodiment of the present invention.

In the embodiment of FIGS. 3 to 5, the SM 121 performs determination on policy application (i.e. determine whether to place a lock).

More specifically, the profile A 119 is in the active state, and the profile B 169 is in the inactive state. In the drawing, the user 131 performs communication with the MNO B 171 initially, then performs communication with the MNO A 141 after MNO switching, and finally attempts to perform MNO switching from the MNO A 141 to the MNO B 171 (i.e. attempting to re-subscribe to the MNO B 171).

At step 601, the UE (or device) 111 uses profile information stored in the eSIM 113 to communicate with the MNO B 171. When the existing profile is disabled, the date of deregistration may be recorded in the SM-SR 123. At step 603, the device 111 uses profile information stored in the eSIM 113 to communicate with the MNO A 141.

A profile may include a network identity and a security key needed to communicate with an MNO. Here, the identity may include at least one of IMSI and MSISDN. For communication with the MNO, the security key may include the security key K corresponding to the master key stored in the authentication center (AUC) and the SIM. A profile may be an operational profile or provisioning profile.

The operational profile describes a procedure for managing remote files and applications, and includes a credential to access an MNO network. The profile content manager is present to manage the contents of the profile, and has an OTA security key of an MNO and MSISDN.

The provisioning profile describes the transport capability for profile and eSIM management between the eSIM 113 and the SM-SR 123.

A profile may include a profile ID, a security key, pins for identifying OTA services, a certificate to authenticate the profile to the other party, parameters associated with security or communication algorithms, information on applications, and information on the algorithm capability of an MNO (algorithms supported by the MNO). The profile may further include profile type information indicating whether the profile is an operational profile or a provisioning profile.

At step 605 or step 607, the customer 131 may send a subscription request containing the eSIM ID to the MNO 171 for re-subscription.

Specifically, the subscription request may be made through the portal site of the MNO 171 at step 607 (case 1).

Alternatively, the subscription request may be made by the customer 131 using a network or Internet access function of the device 111 through the network (e.g. wireless LAN or Internet) of the MNO 171 at step 605 (case 2).

As a response to the request, at step 609 or step 611, the MNO 171 sends a profile ID, eSIM ID, SM ID or SM address, indication to whether an old subscription is present, information on the date of last deregistration, and the identifier of the profile having been used before if utilization of old subscription information is to be checked.

For case 1, at step 611, the above information may be sent to the device 111 having sent the subscription request. In this instance, presence of old subscription information may be notified to the user and the user may be requested to determine whether to reuse the old subscription information. Here, the old subscription information may include the identifier of the profile having been used before.

For case 2, at step 609, the above information may be sent to the portal site at which the subscription request has been made. Thereafter, at step 615, presence of old subscription information is notified to the user 131 and the user is requested to determine whether to reuse the old subscription information. The date of last deregistration may also be notified to the user 131. In this instance, the old subscription information may include the identifier of the profile having been used before.

If the user 113 determines to reuse the old subscription information, at step 617, the old subscription information may be reused. If the user 113 determines not to reuse the old subscription information, at step 617-1, re-subscription to the MNO may be performed using a new profile ID. When the old subscription information is not reused, it may be necessary to additionally perform a procedure for allocating a new profile ID and installing a new profile at step 617-1. When the old subscription information is reused, at step 619, a procedure for re-subscription to the MNO may be performed using the existing profile ID.

At step 608, the eSIM 113 and the SM 121 perform mutual authentication. Here, mutual authentication may be performed in various ways such as matching a private key of the eSIM 113 with a public key of the SM 121, and verifying certificates of the eSIM 113 and the SM 121 by a certificate authority. In the present embodiment, at step 619, the eSIM 113 may send the SM 121 the eSIM ID, profile ID, profile change indication, eSIM capability, and date of the last deregistration (or date of last activation of profile B). Here, the capability of the eSIM 113 may indicate a security credential and security information necessary for the eSIM 113 to generate a profile.

Thereafter, a procedure for determining whether to permit re-subscription is performed along with a policy rule. Here, there may be an embodiment involving step 621 (case 3) and another embodiment involving steps 629, 631 and 633 (case 4). In FIGS. 3 to 5, the SM 121 determines whether to apply a policy. However, separately from policy application, various embodiments are possible according to the entity storing a policy rule. That is, operations and procedures when the policy rule is stored in the SM-SR 123 (case 3: step 621) may differ from those when the policy rule is stored in the profile (case 4: steps 629, 631 and 633).

First, for case 3, as the SM-SR 123 stores the policy rule, the SM 121 may make decisions and hold the policy rule. At step 621, the SM-SR 123 storing the policy rule may determine whether to permit re-subscription by computing the MNO reversion duration for the user (e.g. time between MNO switching from MNO B to MNO A and MNO switching back from MNO A to MNO B). For example, the SM-SR 123 may be configured to disallow re-subscription if the MNO reversion duration is less than three months. Here, if the MNO reversion duration of the user is less than or equal to three months, the SM-SR 123 determines not to permit re-subscription (case 3 -1). If the MNO reversion duration of the user is greater than three months, the SM-SR 123 determines to permit re-subscription (case 3-2).

Next, for case 4, unlike case 3 where the policy rule is stored in the SM-SR 123, the policy rule is present in the profile and the SM-SR 123 or PEF 123-4 may make decisions about policy application and enforcement. At step 623, the SM-SR 123 sends a policy rule query containing a profile ID to the profile B 169 and requests the profile B 169 to compute the MNO reversion duration for the user (e.g. time between MNO switching from MNO B to MNO A and MNO switching back from MNO A to MNO B). At step 625, the profile B 169 computes the MNO reversion duration for the user. At step 627, the profile B 169 sends information regarding the computed MNO reversion duration and policies open to the SM 121 or other MNOs (e.g. policy on re-subscription) to the SM-SR 123.

Thereafter, at step 629, the SM-SR 123 makes decisions and determines whether to permit re-subscription of the device 111 (case 4-1). Alternatively, the SM PEF 123-4 may make decisions about policy enforcement (case 4-2). That is, at step 631, the SM-SR 123 forwards the information regarding the MNO reversion duration and policies open to the SM 121 or other MNOs (e.g. policy on re-subscription) to the SM PEF 123-4. At step 633, the SM PEF 123-4 determines whether to permit re-subscription. That is, the SM PEF 123-4 determines whether to place a lock for enforcement of the policy rule or the lock placed by the MNO is removable.

Meanwhile, as described before in connection with FIG. 1, the SM-SR 123 and the SM-DP 125 or 125-2 may operate as a single entity in the SM 121. The SM-SR 123, the PEF 123-4 and the SM policy rule 123-2 may coexist in the SM 121. The SM-DP 125 or 125-2 may be configured on an MNO basis for managing subscribers of each MNO network.

In the case of MNO reversion (e.g. MNO switching from MNO B to MNO A and MNO switching back from MNO A to MNO B), the re-subscription blocking period may be set to three months. Here, for case 3-1 or case 4-3, if re-subscription is not allowed (lock enforced) owing to non-expiration of the re-subscription blocking period (three months) set as a policy of the MNO B 171, at step 635, the SM 121 notifies the profile manager 115 or the eSIM 113 of lock enforcement (i.e. cannot change the profile of the MNO A 141 to another MNO). Then, at step 635-2, the profile manager 115 or the eSIM 113 may notify the user 131 of MNO change prohibition.

For case 3-2 or case 4-4, if re-subscription to the MNO B is allowed (lock not enforced) owing to expiration of the re-subscription blocking period (three months) set as a policy of the MNO B 171, at step 637, the SM 121 notifies the user 131 that re-subscription to the MNO B 171 is allowed. Specifically, at step 637-2, the SM 121 may notify the profile manager 115 or the eSIM 113 of re-subscription permission. Then, at step 637-4, the profile manager 115 or the eSIM 113 may notify the user 131 of re-subscription permission. Thereafter, at step 638, the user 131 may notify the SM-SR 123 of confirmation of re-subscription to the MNO B 171. Specifically, at step 638-2, as the user 131 confirms re-subscription to the MNO B 171, the confirmation result is sent to the eSIM 113 or the profile manager 115. Then, at step 638-4, the eSIM 113 or the profile manager 115 forwards the confirmation result to the SM-SR 123.

Thereafter, at step 639, the SM-SR 123 notifies the profile manager 115 of a profile change.

At step 641, the profile manager 115 directs the profile installer 167 to activate or enable the profile 169 of the MNO B. At step 643, the profile installer 167 activates the profile 169. Upon successful activation of the profile 169, at step 645, the profile installer 167 may notify the profile manager 115 of successful profile activation. Step 645 may be skipped according to embodiments. At step 647, the profile manager 115 directs the profile installer 167 (or previous profile installer 117 if multiple profile installers are present) to deactivate or disable the profile 119 of the previous MNO. At step 651, the profile installer 117 directs the previous profile 119 to perform deregistration from the previous MNO. At step 653, the previous profile 119 performs deregistration from the previous MNO 141 with a cause indicating profile deactivation. A cause indicating profile deactivation may be used, for example, when MNO switching occurs. Upon successful deregistration, at step 655, the previous profile 119 may notify the profile installer 117 of successful profile deactivation. Step 655 may be skipped according to embodiments. At step 659, the profile manager 115 may send a successful profile change indication and information needed for profile deactivation to the SM-SR 123. At step 661, the SM-SR 123 notifies the previous MNO 141 of profile deactivation. Thereafter, at step 663, communication may be performed with the new MNO 171 (after re-subscription) via the reactivated profile 169.

The procedure for re-subscription described in FIGS. 3 to 5 is focused on reuse of an existing (or old) profile. When a new profile is to be used, it may be necessary to perform additional steps for profile installation and profile activation.

Figure 6:
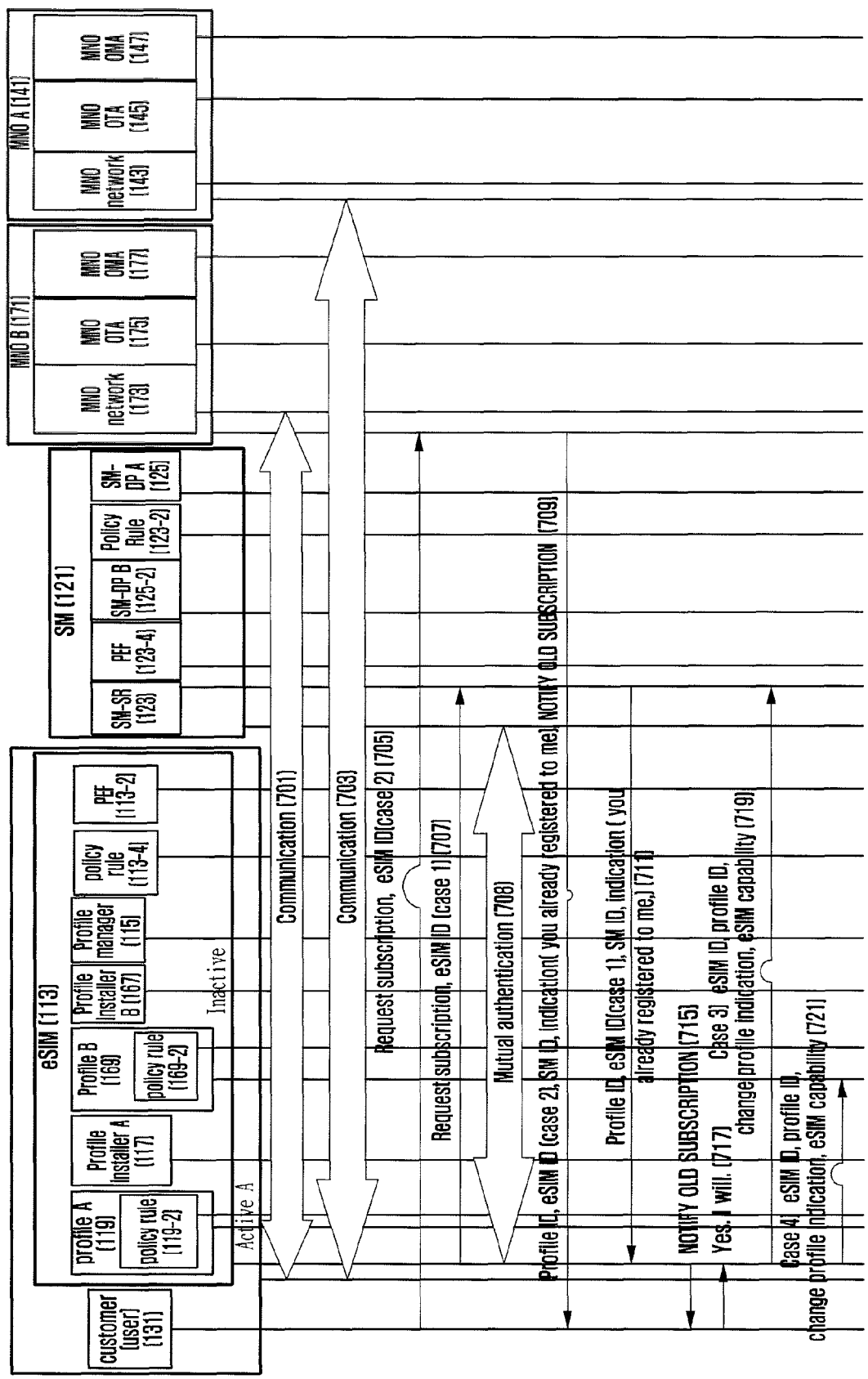
FIGS. 6 to 8 are message sequence charts depicting communication and security procedures to apply policies during MNO re-subscription according to another embodiment of the present invention.
Figure 7:
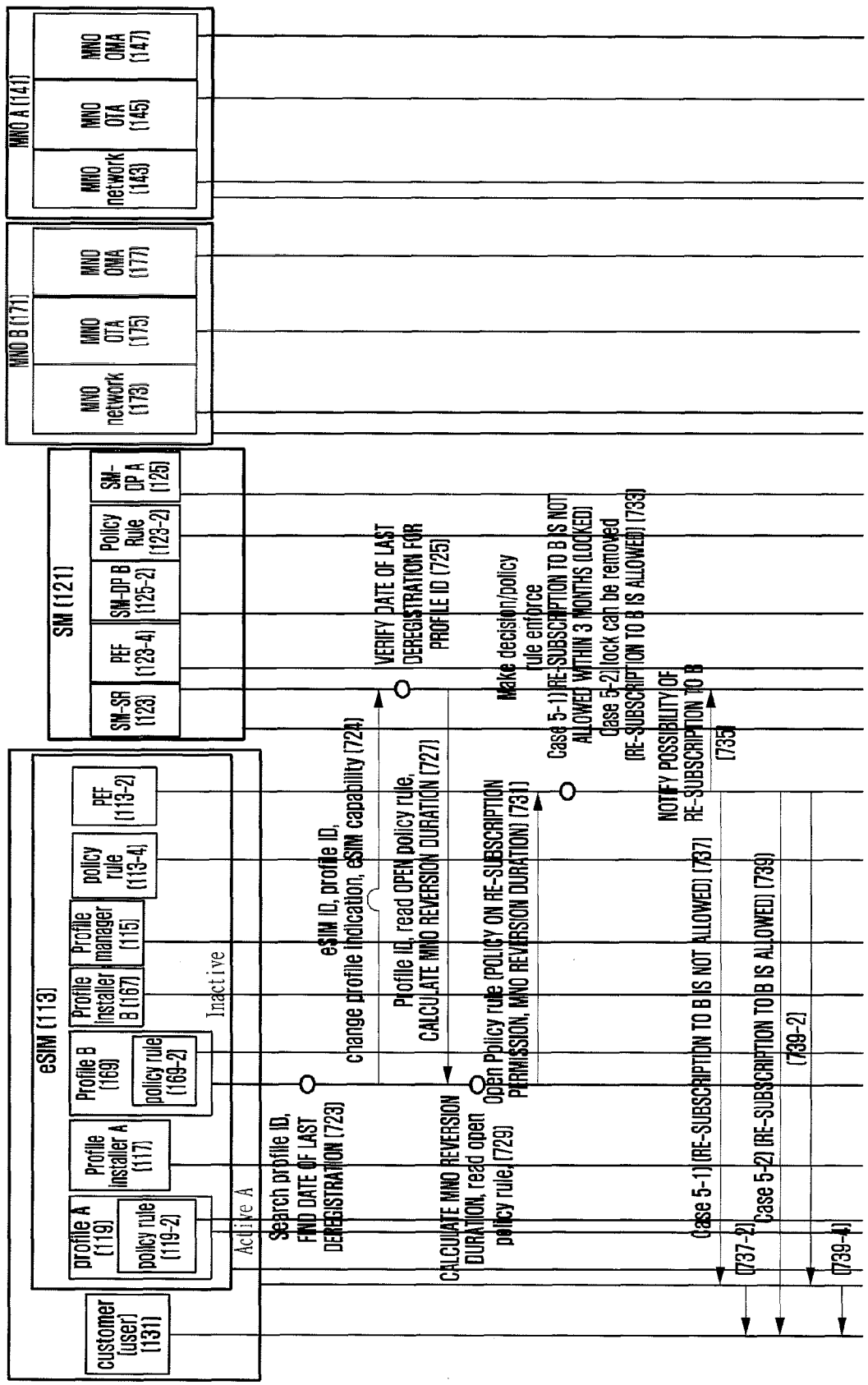
Figure 8:
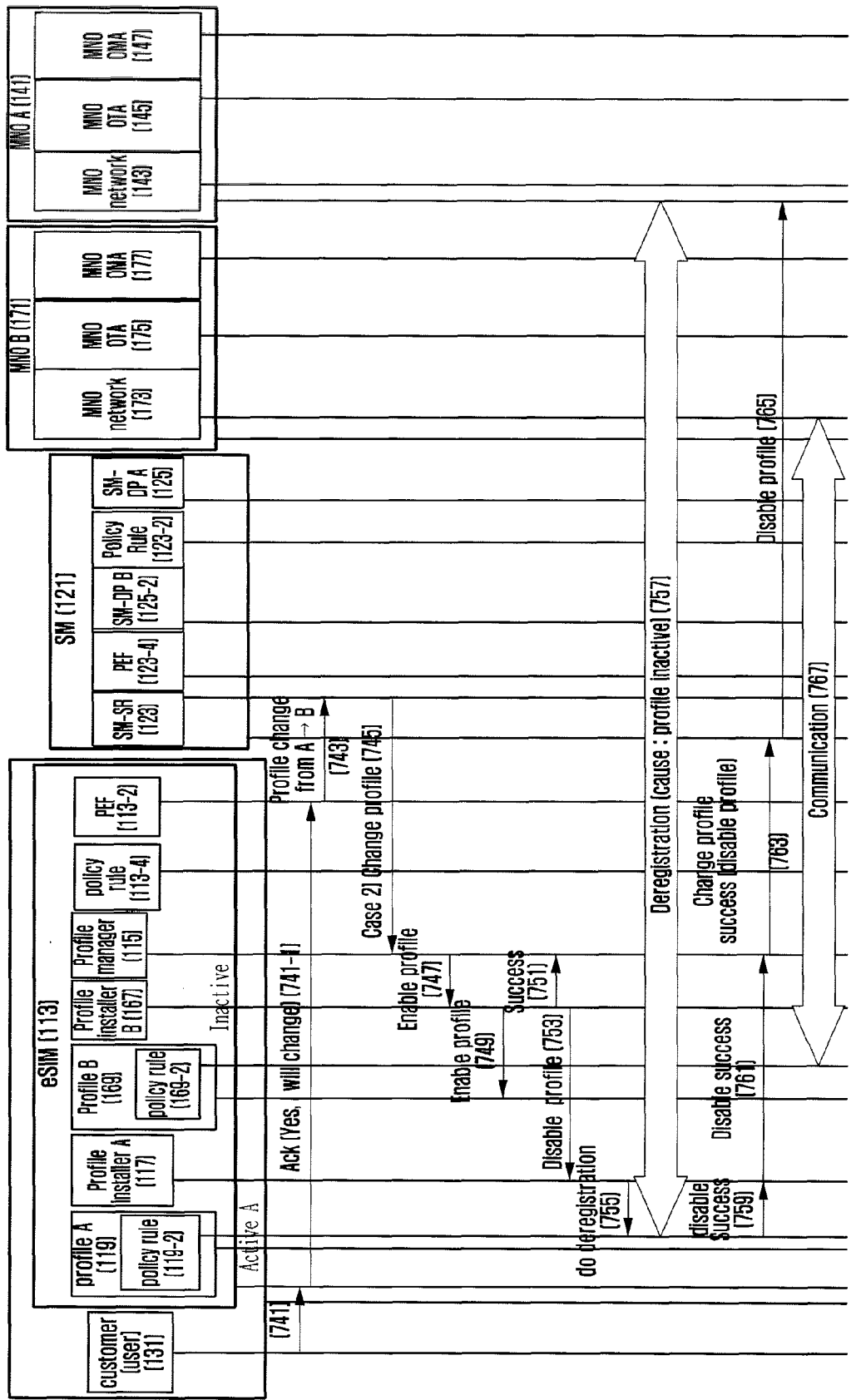

FIGS. 6 to 8 are message sequence charts depicting communication and security procedures to apply policies during MNO re-subscription according to another embodiment of the present invention.

In the embodiment of FIGS. 6 to 8, the profile performs determination on policy application (i.e. determine whether to place a lock).

More specifically, the profile A 119 is in the active state, and the profile B 169 is in the inactive state. In the drawing, the user 131 performs communication with the MNO B 171 initially, then performs communication with the MNO A 141 after MNO switching, and finally attempts to perform MNO switching from the MNO A 141 to the MNO B 171 (i.e. attempting to re-subscribe to the MNO B 171).

At step 701, the UE (or device) 111 uses profile information stored in the eSIM 113 to communicate with the MNO B 171. When the existing profile is disabled, the date of deregistration may be recorded in the SM-SR 123 and eSIM 113. At step 703, the device 111 uses profile information stored in the eSIM 113 to communicate with the MNO A 141.

A profile may include a network identity and a security key K needed to communicate with an MNO. Here, the identity may include at least one of IMSI and MSISDN. For communication with the MNO, the security key may include the security key K corresponding to the master key stored in the authentication center (AUC) and the SIM. A profile may be an operational profile or provisioning profile.

The operational profile describes a procedure for managing remote files and applications, and includes a credential to access an MNO network. The profile content manager is present to manage the contents of the profile, and has an OTA security key of an MNO and MSISDN.

The provisioning profile describes the transport capability for profile and eSIM management between the eSIM 113 and the SM-SR 123.

A profile may include a profile ID, a security key, pins for identifying OTA services, a certificate to authenticate the profile to the other party, parameters associated with security or communication algorithms, information on applications, and information on the algorithm capability of an MNO (i.e. algorithms supported by the MNO). The profile may further include profile type information indicating whether the profile is an operational profile or a provisioning profile.

At step 705 or step 707, the customer 131 may send a subscription request containing the eSIM ID to the MNO 171 for re-subscription.

Specifically, the subscription request may be made through the portal site of the MNO 171 at step 707 (case 1).

Alternatively, the subscription request may be made by the customer 131 using a network or Internet access function of the device 111 through the network (e.g. wireless LAN or Internet) of the MNO 171 at step 705 (case 2).

As a response to the request, at step 709 or step 711, the MNO 171 may send a profile ID, eSIM ID, SM ID or SM address, indication to whether an old subscription is present, information on the date of last deregistration, and the identifier of the profile having been used before if utilization of old subscription information is to be checked.

For case 1, at step 711, the above information may be sent to the device 111 having sent the subscription request. In this instance, presence of old subscription information may be notified to the user and the user may be requested to determine whether to reuse the old subscription information. Here, the old subscription information may include the identifier of the profile having been used before.

For case 2, at step 709, the above information may be sent to the portal site at which the subscription request has been made. Thereafter, at step 715, presence of old subscription information is notified to the user 131 and the user is requested to determine whether to reuse the old subscription information. The date of last deregistration may also be notified to the user 131. In this instance, the old subscription information may include the identifier of the profile having been used before.

If the user 131 determines to reuse the old subscription information, at step 717, the old subscription information may be reused. If the user 131 determines not to reuse the old subscription information, at step 717-1, re-subscription to the MNO may be performed using a new profile ID. When the old subscription information is not reused, it may be necessary to additionally perform a procedure for allocating a new profile ID and installing a new profile at step 717-1. When the old subscription information is reused, at step 719, a procedure for re-subscription to the MNO may be performed using the existing profile ID.

At step 708, the eSIM 113 and the SM 121 perform mutual authentication. Here, mutual authentication may be performed in various ways, such as matching a private key of the eSIM 113 with a public key of the SM 121, and verifying certificates of the eSIM 113 and the SM 121 by a certificate authority.

In one embodiment (case 3), at step 719, the eSIM 113 may send the SM 121 the eSIM ID, profile ID, profile change indication, eSIM capability, and date of the last deregistration (or date of last activation of profile B). Here, the capability of the eSIM 113 may indicate a security credential and security information necessary for the eSIM 113 to generate a profile.

Another embodiment (case 4) involves steps 721, 723 and 724. At step 721, the eSIM 113 may send the profile B 169 the eSIM ID, profile ID, profile change indication, and eSIM capability. At step 723, the profile B 169 may use the profile ID to find the date of the last deregistration (or date of last activation of the profile B) from the MNO B 171. At step 724, the profile B 169 may send the SM 121 the eSIM ID, profile ID, profile change indication, eSIM capability, and date of the last deregistration (or date of last activation of profile B).

At step 725, the SM-SR 123 may verify the date of the last deregistration from the MNO B 171 for the profile ID. At step 727, the SM-SR 123 may send a policy rule query containing the profile ID to the profile B 169 and request the profile B 169 to compute the MNO reversion duration for the user (e.g. time between MNO switching from MNO B to MNO A and MNO switching back from MNO A to MNO B). At step 729, the profile B 169 may compute the MNO reversion duration for the user. At step 731, the profile B 169 may send information regarding the computed MNO reversion duration and policies (e.g. policy on re-subscription) open to the SM 121 or other MNOs (e.g. MNO A) to the eSIM PEF 113-2.

At step 733, when the eSIM PEF 113-2 makes decisions, it may determine whether to permit re-subscription. That is, the eSIM PEF 113-2 may determine whether to place a lock for enforcement of the policy rule or the lock placed by the MNO is removable.

At step 735, the eSIM PEF 113-2 notifies the SM-SR 123 of the result of determination made at step 733 (indication to whether re-subscription to the MNO B is allowed). If MNO change to the MNO B is not allowed, step 745 and subsequent steps will be skipped. If re-subscription to the MNO B is allowed, step 745 and subsequent steps are not skipped.

Meanwhile, as described before in connection with FIG. 1, the SM-SR 123 and the SM-DP 125 or 125-2 may operate as a single entity in the SM 121. The SM-SR 123, the PEF 123-4 and the SM policy rule 123-2 may coexist in the SM 121. The SM-DP 125 or 125-2 may be configured on an MNO basis for managing subscribers of each MNO network.

In the case of MNO reversion (e.g. MNO switching from MNO B to MNO A and MNO switching back from MNO A to MNO B), the re-subscription blocking period may be set to three months owing to the lock. Here, for case 5-1, if re-subscription is not allowed (lock enforced) owing to non-expiration of the re-subscription blocking period (three months) set as a policy of the MNO B 171, at step 737, the eSIM PEF 113-2 may notify the profile manager 115 or the eSIM 113 of lock enforcement (i.e. cannot change the profile of the MNO A 141 to another MNO). Then, at step 737-2, the profile manager 115 or the eSIM 113 may notify the user 131 of MNO change prohibition.

For case 5-2, if re-subscription to the MNO B is allowed (lock not enforced) owing to expiration of the re-subscription blocking period (three months) set as a policy of the MNO B 171, at step 739, the eSIM PEF 113-2 may notify the user 131 that re-subscription to the MNO B 171 is allowed. Specifically, at step 739-2, the eSIM PEF 113-2 may notify the profile manager 115 or the eSIM 113 of re-subscription permission. Then, at step 739-4, the profile manager 115 or the eSIM 113 may notify the user 131 of re-subscription permission. Thereafter, at step 741, the user 131 may notify the eSIM 113 or the profile manager 115 of confirmation of re-subscription to the MNO B 171. At step 741-1, the eSIM 113 or the profile manager 115 may send the confirmation result to the eSIM PEF 113-2. Then, at step 743, the eSIM PEF 113-2 forwards the confirmation result (profile change) to the SM-SR 123.

Thereafter, at step 745, the SM-SR 123 may notify the profile manager 115 of a profile change.

At step 747, the profile manager 115 may direct the profile installer 167 to activate or enable the profile 169 of the MNO B for re-subscription. At step 749, the profile installer 167 activates the profile 169. Upon successful activation of the profile 169, at step 751, the profile installer 167 may notify the profile manager 115 of successful profile activation. Step 751 may be skipped according to embodiments.

At step 753, the profile manager 115 directs the profile installer 167 (or previous profile installer 117 if multiple profile installers are present) to deactivate or disable the profile 119 of the previous MNO. At step 755, the profile installer 117 directs the previous profile 119 to perform deregistration from the previous MNO. At step 757, the previous profile 119 performs deregistration from the previous MNO 141 with a cause indicating profile deactivation. A cause indicating profile deactivation may be used, for example, when MNO switching occurs.

Upon successful deregistration, at step 759, the previous profile 119 may notify the profile installer 117 of successful profile deactivation in relation to the previous MNO 115. Step 759 may be skipped according to embodiments. At step 761, the profile installer 117 notifies the profile manager 115 of successful profile deactivation. At step 763, the profile manager 115 may send a successful profile change indication and information needed for profile deactivation to the SM-SR 123. At step 765, the SM-SR 123 notifies the previous MNO 141 of profile deactivation. Thereafter, at step 767, communication may be performed with the new MNO 171 (after re-subscription) via the reactivated profile 169.

The procedure for re-subscription described in FIGS. 6 to 8 is focused on reuse of an existing (or old) profile. When a new profile is to be used, it may be necessary to perform additional steps for profile installation and profile activation.

Figure 9:
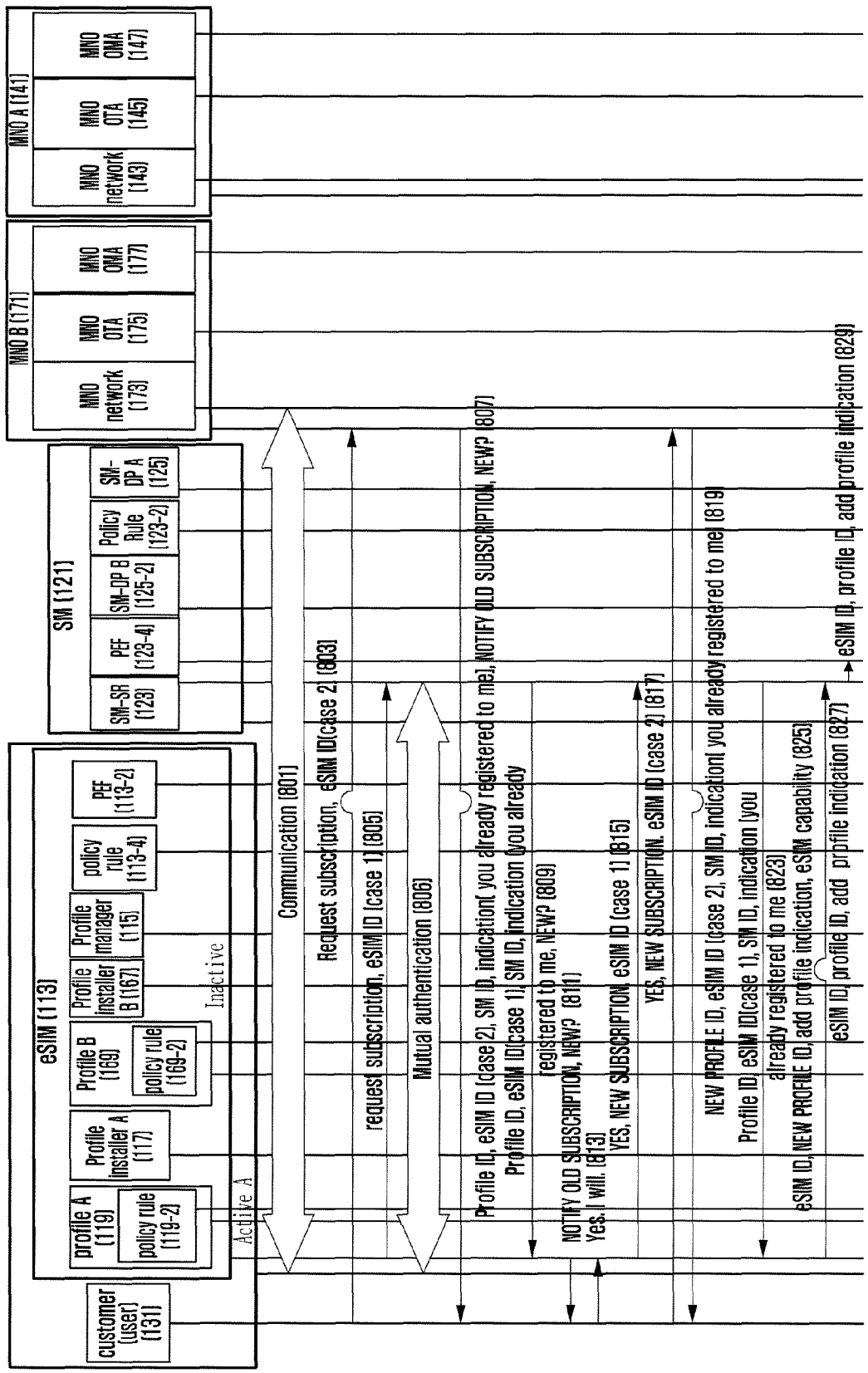
FIGS. 9 to 11 are message sequence charts depicting communication and security procedures to apply policies during additional subscription to the same MNO according to an embodiment of the present invention.
Figure 10:
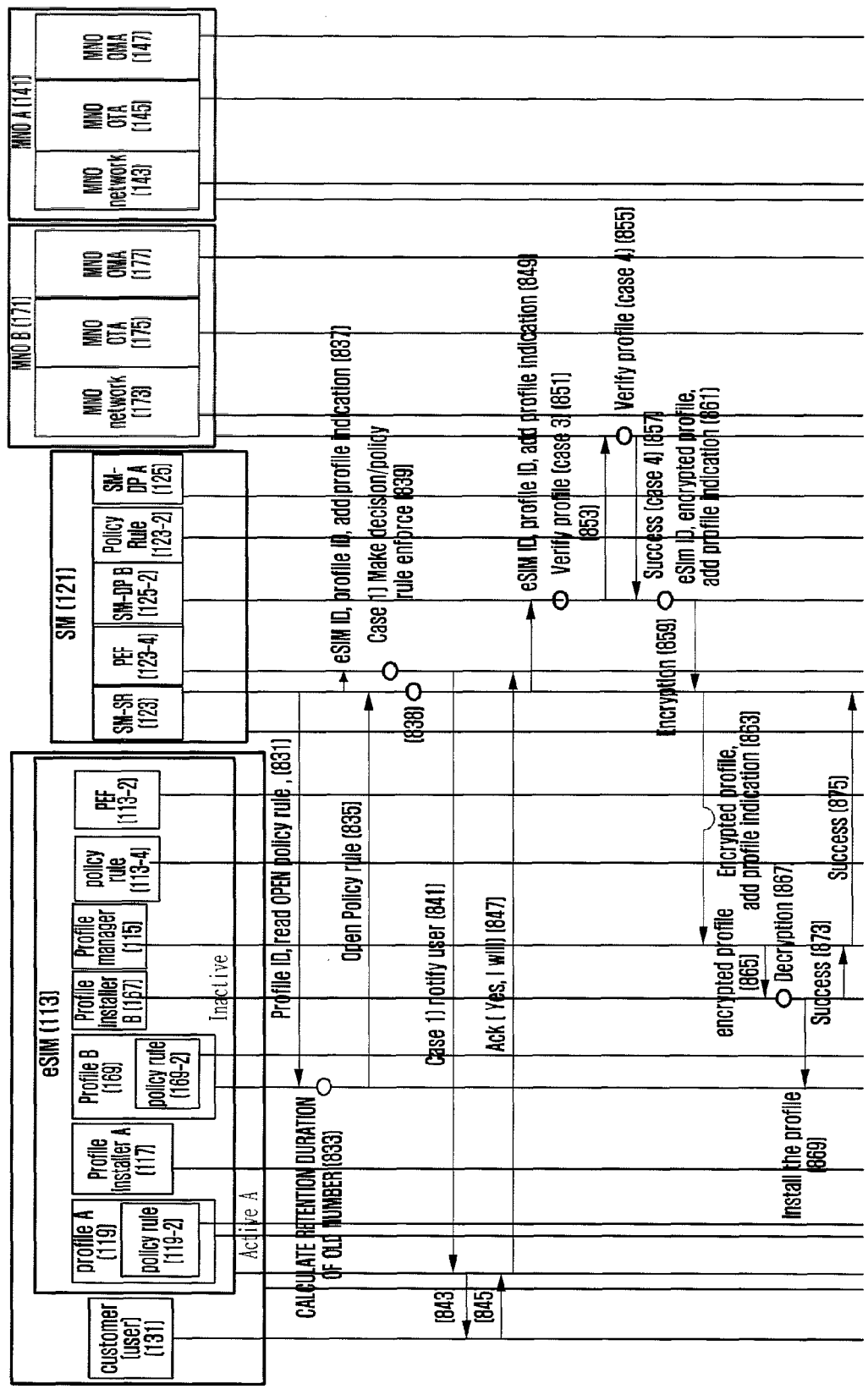
Figure 11:
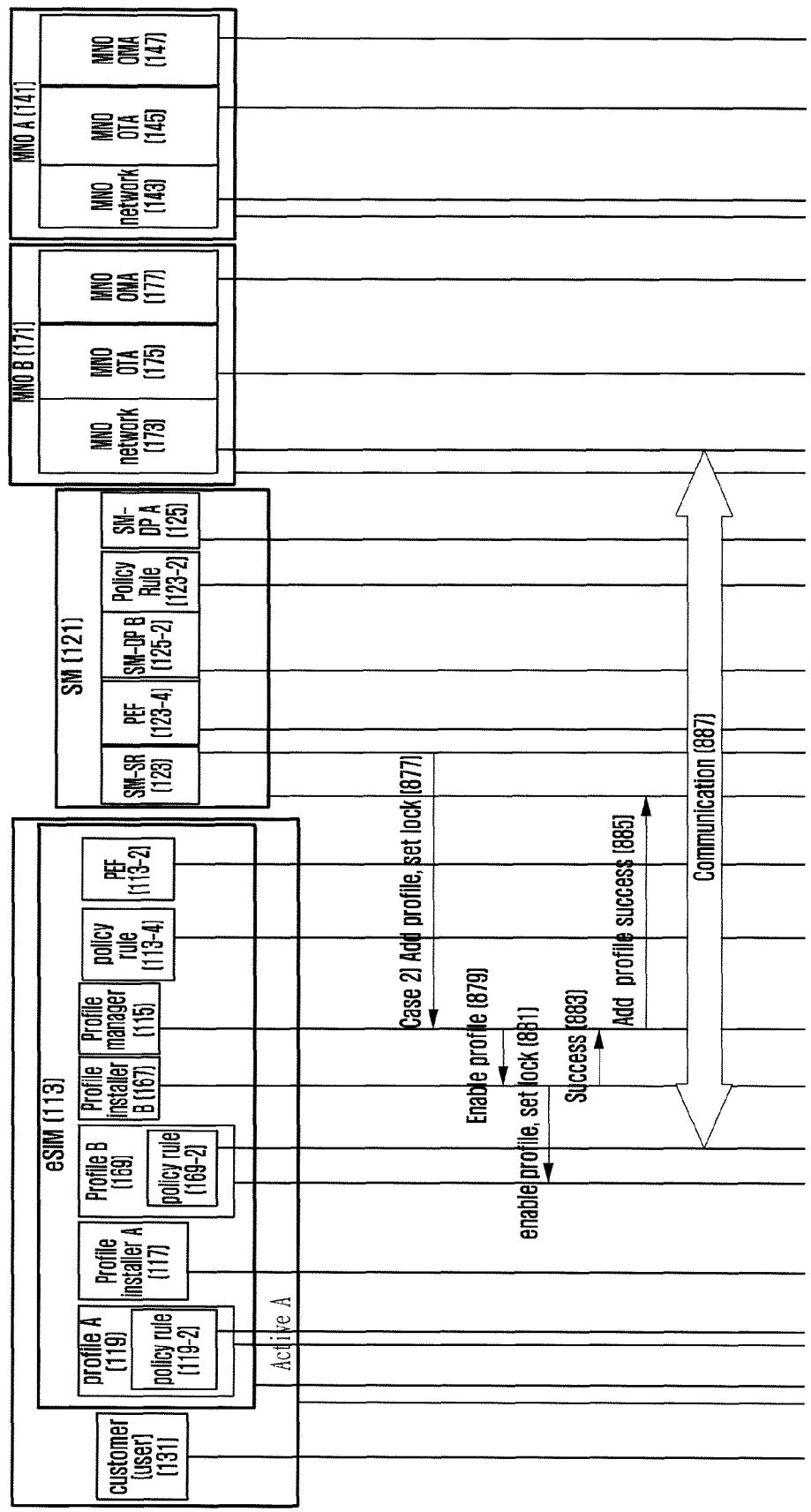

FIGS. 9 to 11 are message sequence charts depicting communication and security procedures to apply policies during additional subscription to the same MNO according to an embodiment of the present invention.

In the embodiment of FIGS. 9 to 11, the SM 121 performs determination on policy application (i.e. determine whether to place a lock).

More specifically, the profile B 169 is in the active state. In the drawing, the user 131 performs communication with the MNO B 171 initially, and then attempts to make an additional subscription to the MNO B 171.

At step 801, the UE (or device) 111 uses profile information stored in the eSIM 113 to communicate with the MNO B 171.

A profile may include a network identity and a security key K needed to communicate with an MNO. Here, the identity may include at least one of IMSI and MSISDN. For communication with the MNO, the security key may include the security key K corresponding to the master key stored in the authentication center (AUC) and the SIM. A profile may be an operational profile or provisioning profile.

The operational profile describes a procedure for managing remote files and applications, and includes a credential to access an MNO network. The profile content manager is present to manage the contents of the profile, and has an OTA security key of an MNO and MSISDN.

The provisioning profile describes the transport capability for profile and eSIM management between the eSIM 113 and the SM-SR 123.

A profile may include a profile ID, a security key, pins for identifying OTA services, a certificate to authenticate the profile to the other party, parameters associated with security or communication algorithms, information on applications, and information on the algorithm capability of an MNO (algorithms supported by the MNO). The profile may further include profile type information indicating whether the profile is an operational profile or a provisioning profile.

At step 803 or step 805, the customer 131 may send a subscription request containing the eSIM ID to the MNO 171 for additional subscription.

Specifically, the subscription request may be made through the portal site of the MNO 171 at step 805 (case 1).

Alternatively, the subscription request may be made by the customer 131 using a network or Internet access function of the device 111 through the network (e.g. wireless LAN or Internet) of the MNO 171 at step 803 (case 2).

As a response to the request, at step 807 or step 809, the MNO 171 sends a profile ID, eSIM ID, SM ID or SM address, indication to whether an old subscription is present, information on the date of last deregistration, request for user intention to reuse old subscription information or make a new subscription, and identifier of the profile having been used before.

For case 1, at step 809, the above information may be sent to the device 111 having sent the subscription request. In this instance, presence of old subscription information may be notified to the user and the user may be requested to determine whether to reuse the old subscription information. The user may also be requested to determine whether to newly subscribe to the same MNO. Here, the old subscription information may include the identifier of the profile having been used before.

For case 2, at step 807, the above information may be sent to the portal site at which the subscription request has been made. Thereafter, at step 811, presence of old subscription information is notified to the user 131 and the user is requested to determine whether to reuse the old subscription information. The date of last deregistration may also be notified to the user 131. The user may also be requested to determine whether to newly subscribe to the same MNO. In this instance, the old subscription information may include the identifier of the profile having been used before.

Upon determining to newly subscribe to the same MNO, at step 813, the user 131 may notify the eSIM 113 of new subscription. At step 815 or step 817, the customer 131 may send a subscription request containing the eSIM ID to the MNO 171 for additional subscription. Specifically, the subscription request may be made through the portal site of the MNO 171 at step 815 as in case 1. Or, the subscription request may be made by the customer 131 using a network or Internet access function of the device 111 through the network (e.g. wireless LAN or Internet) of the MNO 171 at step 817 as in case 2.

As a response to the request, at step 819 or step 823, the MNO 171 sends a profile ID, eSIM ID, SM ID or SM address, and indication to whether an old subscription is present. For case 1, at step 819, the above information may be sent to the device 111 having sent the subscription request. In this instance, presence of old subscription information may be notified to the user. For case 2, at step 823, the above information may be sent to the portal site at which the subscription request has been made.

At step 806, the eSIM 113 and the SM 121 perform mutual authentication. Here, mutual authentication may be performed in various ways, such as matching a private key of the eSIM 113 with a public key of the SM 121, and verifying certificates of the eSIM 113 and the SM 121 by a certificate authority. In the present embodiment, at step 825, the eSIM 113 may send the SM 121 the eSIM ID, new profile ID, profile addition indication, eSIM capability, and date when the old number was open. Here, the capability of the eSIM 113 may indicate a security credential and security information necessary for the eSIM 113 to generate a profile. At step 827, the SM 121 may forward the eSIM ID, new profile ID, and profile addition indication to the SM-SR 123. Step 825 and step 827 may be merged into step 829 according to the configuration of the SM 121. For example, when the SM-SR 123 is shared by multiple MNOs and the SM-DP 125 or 125-2 is configured on a per-MNO basis, as the SM-SR 123 receives a request from the eSIM 113, step 825 and step 827 may be merged into step 829 (one step).

In the event that the policy rule is present in the profile and the SM-SR 123 or PEF 123-4 makes decisions about policy application and enforcement, steps 831, 833 and 835 may be performed as an embodiment. At step 831, the SM-SR 123 sends a policy rule query containing the old profile ID to the profile B 169 and requests the profile B 169 to compute the retention duration of the old profile. At step 833, the profile B 169 computes the retention duration of the old profile. Alternatively, the profile lock expiration time may be checked. At step 835, the profile B 169 sends information regarding the computed retention duration of the old profile and policies (e.g. policy on additional subscription) open to the SM 121 or other MNOs (e.g. MNO A) to the SM-SR 123.

Thereafter, at step 838, the SM-SR 123 may make decisions and determine whether to permit additional subscription. Alternatively, instead of the SM-SR 123, the SM PEF 123-4 may make decisions about policy enforcement. That is, at step 837, the SM-SR 123 may forward the eSIM ID, new profile ID, and profile addition indication, retention duration of the old profile at the MNO B 171 and policies open to the SM 121 or other MNOs (e.g. policy on additional subscription limitation) to the SM PEF 123-4. At step 839, the SM PEF 123-4 makes a determination about additional subscription limitations. That is, the SM PEF 123-4 may apply the policy rule to determine whether to impose a lock on the newly added profile for a given duration (e.g. place a lock on a new profile to maintain the new profile for four months or more).

Meanwhile, as described before in connection with FIG. 1, the SM-SR 123 and the SM-DP 125 or 125-2 may operate as separate entities in the SM 121. The SM-SR 123, the PEF 123-4 and the SM policy rule 123-2 may coexist in the SM 121. The SM-DP 125 or 125-2 may be configured on an MNO basis for managing subscribers of each MNO network.

To impose a lock for additional subscription to maintain the new subscription for a given duration, at step 841, the SM 121 may notify the profile manager 115 or the eSIM 113 of lock enforcement (i.e. placement of a lock to maintain subscription information related to the new number for a given duration). Then, at step 843, the profile manager 115 or the eSIM 113 may notify necessity of lock placement to the user 131. Thereafter, at step 845, as the user 131 confirms additional subscription to the MNO B 171 and lock placement to the eSIM 113, the confirmation result is sent to the eSIM 113 or the profile manager 115. Then, at step 847, the eSIM 113 or the profile manager 115 forwards the confirmation result to the SM-SR 123.

Thereafter, at step 849, the SM-SR 123 may send the eSIM ID, profile ID, and profile addition indication to the SM-DP 125-2.

In one embodiment (case 3), at step 851, the SM-DP 125-2 may verify the profile ID.

In another embodiment (case 4), at step 853, the SM-DP 125-2 may forward the eSIM ID, profile ID, and profile addition indication to the MNO B 171. At step 855, the MNO B 171 may verify the validity of the profile ID. If the profile ID is valid, at step 857, the MNO B 171 may notify the SM-DP 125-2 of validation success.

Thereafter, at step 859, the SM-DP 125-2 may encrypt the corresponding profile. At step 861, the SM-DP 125-2 may send the encrypted profile, eSIM ID, profile ID, and profile addition indication to the SM-SR 123. At step 863, the SM-SR 123 may forward the encrypted profile and profile addition indication to the profile manager 115. At step 865, the profile manager 115 may forward the encrypted profile to the profile installer 167. At step 867, the profile installer 167 may decrypt the received profile. At step 869, the profile installer 167 may install the decrypted profile 169. At step 873, the profile installer 167 may notify the profile manager 115 of the profile installation result. At step 875, the profile manager 115 may notify the SM-SR 123 of the profile installation result.

Thereafter, at step 877, the SM-SR 123 may request the profile manager 115 to activate the added profile. Here, the SM-SR 123 may place a removal blocking lock (expiration lock) on the newly added profile. For example, a lock may be imposed on a newly added profile to sustain the profile for a given duration (e.g. at least four months).

At step 879, the profile manager 115 may directs the profile installer 167 to install the profile and place a removal blocking lock on the profile. At step 881, the profile installer 167 may install the profile 169 and place a removal blocking lock on the profile 169. At step 883, the profile installer 167 may notify the profile manager 115 of the profile installation result. At step 885, the profile manager 115 may notify the SM-SR 123 of the profile addition result (success or failure). Thereafter, at step 887, communication may be performed with the MNO 171 via the newly added profile 169.

Figure 12:
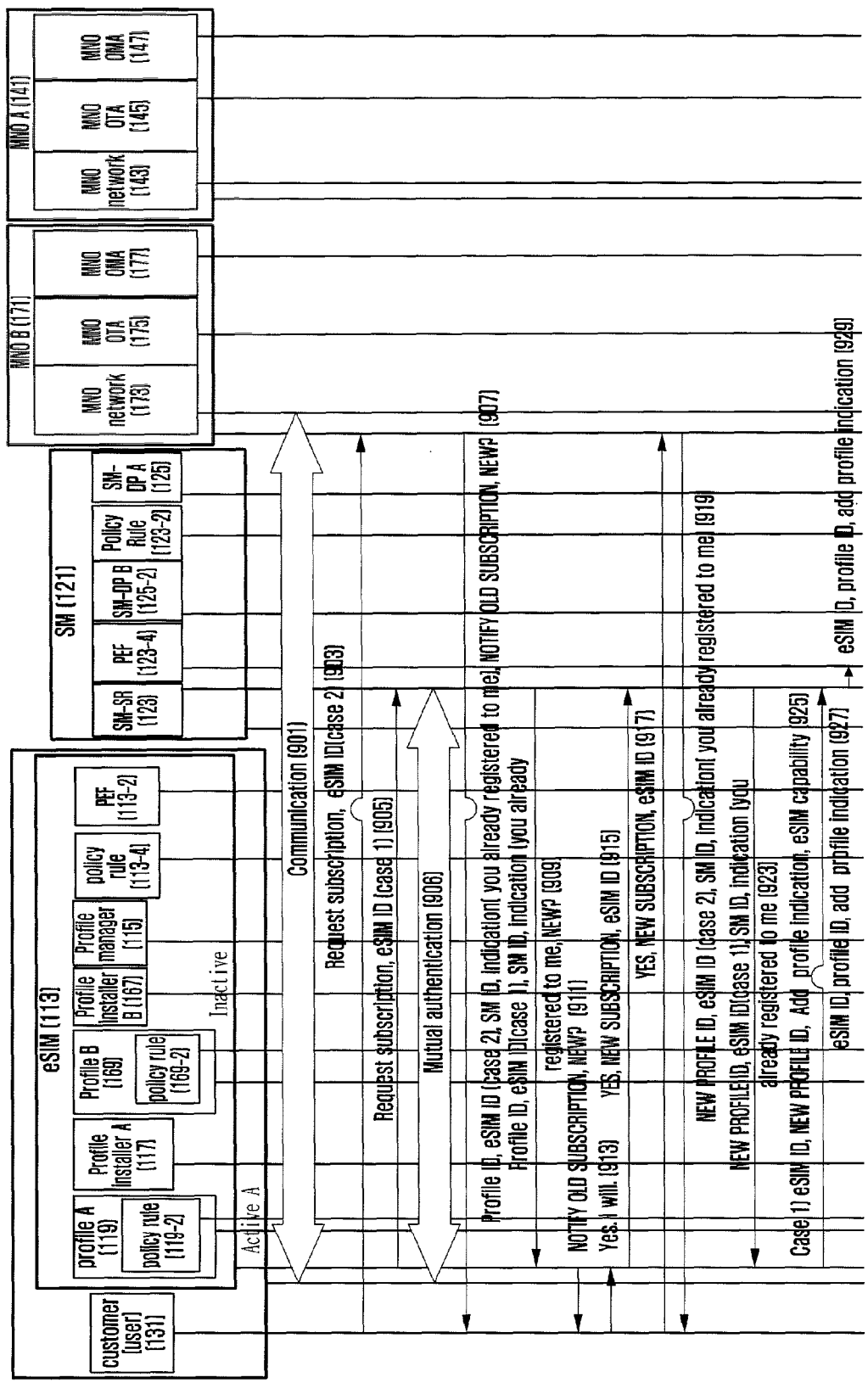
FIGS. 12 to 14 are message sequence charts depicting communication and security procedures to apply policies during additional subscription to the same MNO according to another embodiment of the present invention.
Figure 13:
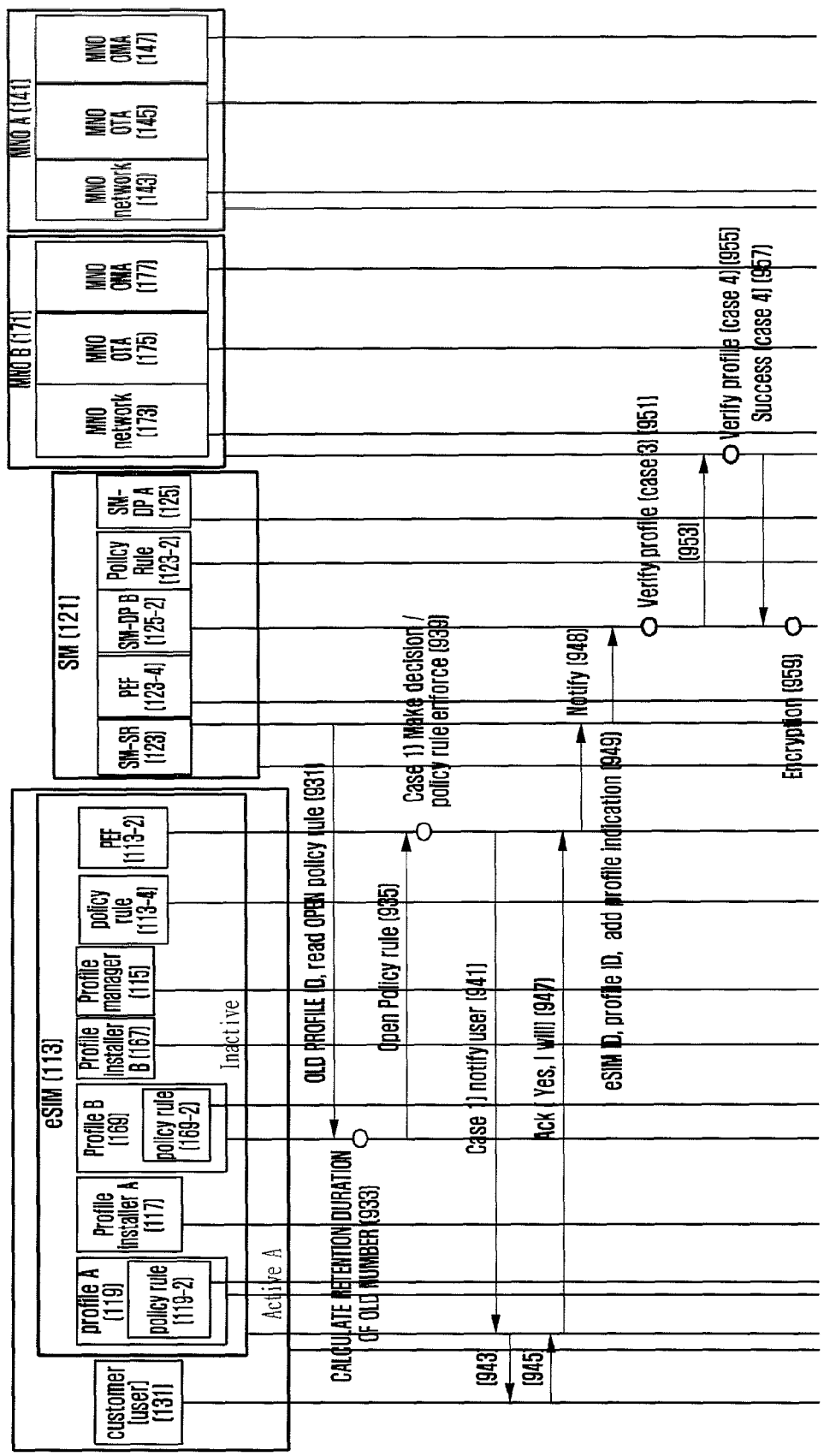
Figure 14:
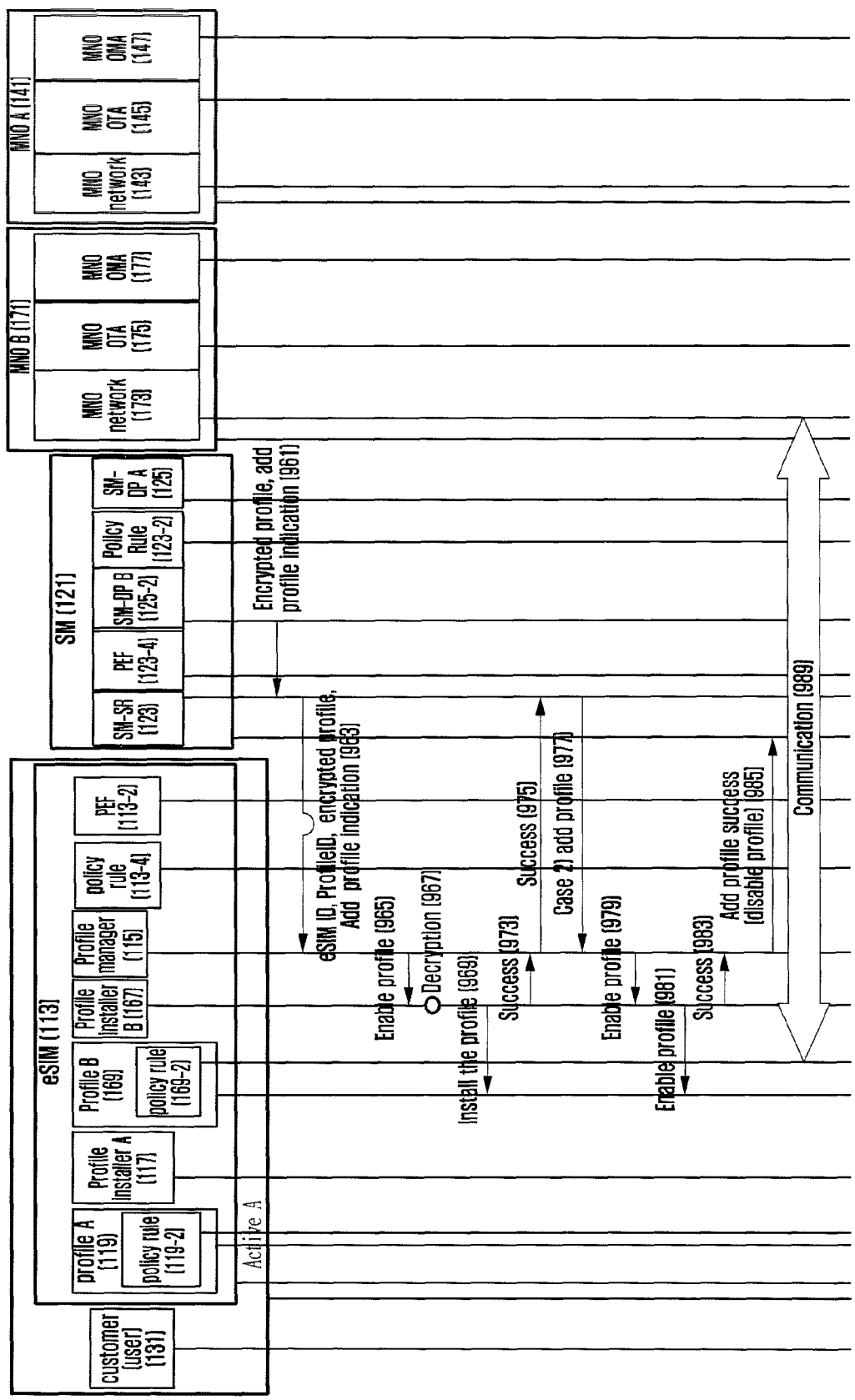

FIGS. 12 to 14 are message sequence charts depicting communication and security procedures to apply policies during additional subscription to the same MNO according to another embodiment of the present invention.

In the embodiment of FIGS. 12 to 14, the profile performs determination on policy application (i.e. determine whether to place a lock).

More specifically, the profile B 169 is in the active state. In the drawing, the user 131 performs communication with the MNO B 171 initially, and then attempts to make an additional subscription to the MNO B 171.

At step 901, the UE (or device) 111 uses profile information stored in the eSIM 113 to communicate with the MNO B 171. Here, both the SM-SR 123 and the eUICC record the point in time when an existing profile is enabled or activated.

A profile may include a network identity and a security key K needed to communicate with an MNO. Here, the identity may include at least one of IMSI and MSISDN. For communication with the MNO, the security key may include the security key K corresponding to the master key stored in the authentication center (AUC) and the SIM. A profile may be an operational profile or provisioning profile.

The operational profile describes a procedure for managing remote files and applications, and includes a credential to access an MNO network. The profile content manager is present to manage the contents of the profile, and has an OTA security key of an MNO and MSISDN.

The provisioning profile describes the transport capability for profile and eSIM management between the eSIM 113 and the SM-SR 123.

A profile may include a profile ID, a security key, pins for identifying OTA services, a certificate to authenticate the profile to the other party, parameters associated with security or communication algorithms, information on applications, and information on the algorithm capability of an MNO (algorithms supported by the MNO). The profile may further include profile type information indicating whether the profile is an operational profile or a provisioning profile.

At step 903 or step 905, the customer 131 may send a subscription request containing the eSIM ID to the MNO 171 for additional subscription.

Specifically, the subscription request may be made through the portal site of the MNO 171 at step 905 (case 1).

Alternatively, the subscription request may be made by the customer 131 using a network or Internet access function of the device 111 through the network (e.g. wireless LAN or Internet) of the MNO 171 at step 903 (case 2).

As a response to the request, at step 907 or step 909, the MNO 171 sends a profile ID, eSIM ID, SM ID or SM address, indication to whether an old subscription is present, information on the date of last deregistration, request for user intention to reuse old subscription information or make a new subscription, and identifier of the profile having been used before.

For case 1, at step 909, the above information may be sent to the device 111 having sent the subscription request. In this instance, presence of old subscription information may be notified to the user and the user may be requested to determine whether to reuse the old subscription information. The user may also be requested to determine whether to newly subscribe to the same MNO. Here, the old subscription information may include the identifier of the profile having been used before.

For case 2, at step 907, the above information may be sent to the portal site at which the subscription request has been made. Thereafter, at step 911, presence of old subscription information is notified to the user 131 and the user is requested to determine whether to reuse the old subscription information. The date of last deregistration may also be notified to the user 131. The user may also be requested to determine whether to newly subscribe to the same MNO. In this instance, the old subscription information may include the identifier of the profile having been used before.

Upon determining to newly subscribe to the same MNO, at step 913, the customer 131 may notify the eSIM 113 of new subscription. At step 915 or step 917, the customer 131 may send a subscription request containing the eSIM ID to the MNO 171 for additional subscription. Specifically, the subscription request may be made through the portal site of the MNO 171 at step 915 as in case 1. Or, the subscription request may be made by the customer 131 using a network or Internet access function of the device 111 through the network (e.g. wireless LAN or Internet) of the MNO 171 at step 917 as in case 2.

As a response to the request, at step 919 or step 923, the MNO 171 sends a new profile ID, eSIM ID, SM ID or SM address, and indication to whether an old subscription is present. For case 1, at step 919, the above information may be sent to the device 111 having sent the subscription request. In this instance, presence of old subscription information may be notified to the user. For case 2, at step 923, the above information may be sent to the portal site at which the subscription request has been made.

At step 906, the eSIM 113 and the SM 121 perform mutual authentication. Here, mutual authentication may be performed in various ways, such as matching a private key of the eSIM 113 with a public key of the SM 121, and verifying certificates of the eSIM 113 and the SM 121 by a certificate authority. In the present embodiment, at step 925, the eSIM 113 may send the SM 121 the eSIM ID, new profile ID, profile addition indication, eSIM capability, and date when the old number was open. Here, the capability of the eSIM 113 may indicate a security credential and security information necessary for the eSIM 113 to generate a profile. At step 927, the SM 121 may forward the eSIM ID, new profile ID, and profile addition indication to the SM-SR 123. Step 925 and step 927 may be merged into step 929 according to the configuration of the SM 121. For example, when the SM-SR 123 is shared by multiple MNOs and the SM-DP 125 or 125-2 is configured on a per-MNO basis, as the SM-SR 123 receives a request from the eSIM 113, step 925 and step 927 may be merged into step 929 (one step).

In the event that the policy rule is present in the profile and the profile makes decisions about policy application and enforcement, steps 931, 933 and 935 may be performed as an embodiment. At step 931, the SM-SR 123 sends a policy rule query containing the old profile ID to the profile B 169 and requests the profile B 169 to compute the retention duration of the old profile at the MNO B 171. At step 933, the profile B 169 computes the retention duration of the old profile at the MNO B 171. Alternatively, the profile lock expiration time may be checked. At step 935, the profile B 169 sends information regarding the computed retention duration of the old profile and policies (e.g. policy on additional subscription limitation) open to the SM 121 or other MNOs (e.g. MNO A) to the SM-SR 123.

Thereafter, at step 938, the SM-SR 123 may make decisions and determine whether to permit additional subscription. Alternatively, instead of the SM-SR 123, the SM PEF 123-4 may make decisions about policy enforcement. That is, at step 937, the SM-SR 123 may forward the eSIM ID, new profile ID, and profile addition indication, retention duration of the old profile at the MNO B 171, and policies (e.g. policy on additional subscription limitation) open to the SM 121 or other MNOs (e.g. MNO A) to the SM PEF 123-4.

At step 939, the eSIM PEF 113-2 makes a determination about additional subscription limitations. That is, the eSIM PEF 113-2 may apply the policy rule to determine whether to impose a lock on the newly added profile for a given duration (e.g. place a lock on a new profile to sustain the new profile for four months or more).

Meanwhile, as described before in connection with FIG. 1, the SM-SR 123 and the SM-DP 125 or 125-2 may operate as separate entities in the SM 121. The SM-SR 123, the PEF 123-4 and the SM policy rule 123-2 may coexist in the SM 121. The SM-DP 125 or 125-2 may be configured on an MNO basis for managing subscribers of each MNO network.

To impose a lock for additional subscription to maintain the new subscription for a given duration, at step 941, the SM 121 may notify the profile manager 115 or the eSIM 113 of lock enforcement (i.e. placement of a lock to maintain subscription information related to the new number for a given duration). Then, at step 943, the profile manager 115 or the eSIM 113 may notify necessity of lock placement to the user 131. Thereafter, at step 945, as the user 131 confirms additional subscription to the MNO B 171 and lock placement to the eSIM 113, the confirmation result is sent to the eSIM 113 or the profile manager 115. Then, at step 947, the eSIM 113 or the profile manager 115 forwards the confirmation result to the eSIM PEF 113-2. At step 948, the eSIM PEF 113-2 may forward the confirmation result to the SM-SR 123. Steps 947 and 948 may be performed as a single step other than as separate steps. That is, user conformation information may be directly sent from the eSIM 113 or profile manager 115 to the SM-SR 123.

Thereafter, at step 949, the SM-SR 123 may send the eSIM ID, profile ID, and profile addition indication to the SM-DP 125-2.

In one embodiment (case 3), at step 951, the SM-DP 125-2 may verify the profile ID.

In another embodiment (case 4), at step 953, the SM-DP 125-2 may forward the eSIM ID, profile ID, and profile addition indication to the MNO B 171. At step 955, the MNO B 171 may verify the validity of the profile ID. If the profile ID is valid, at step 957, the MNO B 171 may notify the SM-DP 125-2 of validation success.

Thereafter, at step 959, the SM-DP 125-2 may encrypt the corresponding profile. At step 961, the SM-DP 125-2 may send the encrypted profile, eSIM ID, profile ID, and profile addition indication to the SM-SR 123. At step 963, the SM-SR 123 may forward the encrypted profile and profile addition indication to the profile manager 115. At step 965, the profile manager 115 may forward the encrypted profile to the profile installer 167. At step 967, the profile installer 167 may decrypt the received profile. At step 969, the profile installer 167 may install the decrypted profile 169. At step 973, the profile installer 167 may notify the profile manager 115 of the profile installation result (success or failure). At step 975, the profile manager 115 may notify the SM-SR 123 of the profile installation result.

Thereafter, at step 977, the SM-SR 123 may request the profile manager 115 to activate the added profile. Here, the SM-SR 123 may place a removal blocking lock (expiration lock) on the newly added profile. For example, a lock may be imposed on a newly added profile to sustain the profile for a given duration (e.g. at least four months).

At step 979, the profile manager 115 may directs the profile installer 167 to install the profile and place a removal blocking lock on the profile. At step 981, the profile installer 167 may install the profile 169 and place a removal blocking lock on the profile 169. At step 983, the profile installer 167 may notify the profile manager 115 of the profile installation result. At step 985, the profile manager 115 may notify the SM-SR 123 of the profile addition result (success or failure). Thereafter, at step 987, communication may be performed with the MNO 171 via the newly added profile 169.

Meanwhile, a device of the present invention may communicate through a first MNO network, perform MNO switching to another MNO, and make a re-subscription to the first MNO network for communication. During this process, the device may determine whether to enforce locking according to an MNO policy and change MNO-related profiles according to the determination result. Additionally, the device of the present invention may communicate through an MNO network and make an additional subscription to the same MNO network for additional communication. During this process, the device may determine whether to enforce locking for additional communication through the MNO network according to MNO policies and configure an additional MNO-related profile depending upon the determination result.

Various embodiments for accommodation and application of policies related to MNO switching enable the eSIM to perform subscriber identification as in the case of an existing SIM. The present invention may provide a scheme that enables reuse of a device or eSIM in concert with MNO switching during the product lifecycle without being locked to a particular MNO but that can place a lock to block switching to a different MNO or to block additional subscription to the same MNO according to MNO policies.

Accordingly, in an environment such as Universal Terrestrial Radio Access Network (UTRAN), GSM/EDGE Radio Access Network (GERAN) or Evolved UTRAN (EUTRAN), when a device having an eSIM in communication with a first MNO attempts to make a re-subscription to a second MNO or make an additional subscription to the first MNO, or when the device attempts to make a re-subscription or additional subscription to an MNO according to a national electricity or infrastructure plan for M2M equipment, it is possible to accommodate MNO policies and configure settings for communication with MNOs. When a re-subscription or additional subscription is not allowed owing to MNO policies, it is possible to safely update or reconfigure communication and security information in the eSIM by placing a lock. Hence, efficiency and security of communication can be heightened.

Hereinabove, various embodiments of the present invention have been shown and described for the purpose of illustration without limiting the subject matter of the present invention. It should be understood by those skilled in the art that many variations and modifications of the method and apparatus described herein will still fall within the scope of the present invention.

Specific terms or words used in the description should be construed in accordance with the spirit of the present invention without limiting the subject matter thereof. It should be understood that variations and modifications of the basic inventive concept described herein will still fall within the spirit and scope of the present invention as defined in the appended claims and their equivalents.

The invention claimed is:

1. A method of communication for a user equipment (UE), the method comprising:
   sending, while including a first subscription to a first network through a first profile, a subscription request for a second subscription to the first network;
   receiving first network access information containing a second profile identifier associated with the first network in response to the subscription request; and
   determining whether de-subscription restriction information related to the second subscription is contained in the first network access information based on an indication indicating that a cancellation of the second subscription for the first network is not allowed within a preset duration.

2. The method of claim 1, wherein determining whether the de-subscription restriction information related to the second subscription is contained in the first network access information comprises:
   determining whether the cancellation of the second subscription is not allowed for the preset duration; and
   blocking, when the cancellation of the second subscription is not allowed for the preset duration, the cancellation of the second subscription for the preset duration.

3. The method of claim 1, wherein determining whether the de-subscription restriction information related to the second subscription is contained in the first network access information comprises:
   sending information that is necessary for determining whether a cancellation of the second subscription is not allowed for a preset duration; and
   receiving an indication indicating that the cancellation of the second subscription for the first network is not allowed within the preset duration.

4. The method of claim 1, wherein determining whether the de-subscription restriction information related to the second subscription is contained in the first network access information further comprises providing an interface configured to notify a user of a presence of the de-subscription restriction information related to the second subscription for the first network.

5. A method of communication for a device, the method comprising:
   receiving, while a first subscription to a first network is maintained, a subscription request for a second subscription to the first network;
   sending first network access information containing a second profile identifier associated with the first network in response to the subscription request;
   determining whether the first network access information contains de-subscription restriction information related to the second subscription; and
   receiving information for determining whether a cancellation of the second subscription is not allowed for a preset duration.

6. The method of claim 5, wherein determining whether the first network access information contains the de-subscription restriction information comprises:
   determining whether a cancellation of the second subscription is not allowed for a preset duration; and
   sending, when the cancellation of the second subscription is not allowed for the preset duration, an indication indicating that the cancellation of the second subscription is not allowed for the preset duration.

7. The method of claim 6, further comprising:
   sending a request for the information that is necessary for determining whether the cancellation of the second subscription is not allowed for the preset duration; and
   receiving the information that is necessary for determining whether the cancellation of the second subscription is not allowed for the preset duration.

8. A user equipment (UE) comprising:
   a communication unit configured to communicate with an external device; and
   a controller configured to:
      send, while including a first subscription to a first network through a first profile, a subscription request for a second subscription to the first network;
      receive first network access information containing a second profile identifier associated with the first network in response to the subscription request; and
      determine whether de-subscription restriction information related to the second subscription is contained in the first network access information based on an indication indicating that a cancellation of the second subscription for the first network is not allowed within a preset duration.

9. The user equipment of claim 8, wherein the controller further configured to control to determine whether cancellation of the second subscription is not allowed for a preset duration, and block when cancellation of the second subscription is not allowed for the preset duration, cancellation of the second subscription for the preset duration.

10. The user equipment of claim 8, wherein the controller is further configured to:
    send information that is necessary for determining whether cancellation of the second subscription is not allowed for a preset duration; and
    receive the indication indicating that cancellation of the second subscription for the first network is not allowed within the preset duration.

11. The user equipment of claim 8, wherein the controller is further configured to provide an interface that notifies a user of presence of de-subscription restriction information related to the second subscription for the first network.

12. A device in a communication system, comprising:
    a communication unit configured to communicate with a user equipment; and
    a controller configured to:
       receive, while a first subscription to a first network is maintained, a subscription request for a second subscription to the first network;
       send first network access information containing a second profile identifier associated with the first network in response to the subscription request;
       determine whether the first network access information contains de-subscription restriction information related to the second subscription; and
       receive information for determining whether a cancellation of the second subscription is not allowed for a preset duration.

13. The device of claim 12, wherein the controller is further configured to:
- determine whether cancellation of the second subscription is not allowed for a preset duration; and
- send when cancellation of the second subscription is not allowed for the preset duration, an indication indicating that cancellation of the second subscription is not allowed for the preset duration.

14. The device of claim 13, wherein the controller is further configured to:
- send a request for the information that is necessary for determining whether cancellation of the second subscription is not allowed for a preset duration; and
- receive the information that is necessary for determining whether cancellation of the second subscription is not allowed for the preset duration.

* * * * *